United States Patent
Yan

(10) Patent No.: US 12,530,097 B2
(45) Date of Patent: Jan. 20, 2026

(54) DISPLAY PANEL, DISPLAY APPARATUS, AND CONTROL METHOD FOR DISPLAY APPARATUS

(71) Applicants: Chengdu BOE Optoelectronics Technology Co., Ltd., Sichuan (CN); BOE Technology Group Co., Ltd., Beijing (CN)

(72) Inventor: Jun Yan, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/846,717

(22) PCT Filed: Sep. 4, 2023

(86) PCT No.: PCT/CN2023/116640
§ 371 (c)(1),
(2) Date: Sep. 13, 2024

(87) PCT Pub. No.: WO2024/060974
PCT Pub. Date: Mar. 28, 2024

(65) Prior Publication Data
US 2025/0208726 A1   Jun. 26, 2025

(30) Foreign Application Priority Data
Sep. 22, 2022  (CN) .......................... 202211157563.2

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/04166* (2019.05);
(Continued)

(58) Field of Classification Search
None
See application file for complete search history.

(56) References Cited

U.S. PATENT DOCUMENTS

2018/0129341 A1   5/2018  Bae et al.
2018/0329544 A1*  11/2018 Yeh ........................ G06F 3/0443
(Continued)

FOREIGN PATENT DOCUMENTS

| CN | 106775126 A | 5/2017 |
| CN | 111625131 A | 9/2020 |

(Continued)

OTHER PUBLICATIONS

The First Office Action mailed Jul. 8, 2025, in Chinese Application No. 202211157563.2, 12 pages including English translation.

*Primary Examiner* — Krishna P Neupane
(74) *Attorney, Agent, or Firm* — XSENSUS LLP

(57) ABSTRACT

A display panel includes a touch region and a peripheral region, the peripheral region includes a bonding region, and the touch region includes a plurality of touch sub-regions. The display panel includes touch channels, a plurality of touch wires and a plurality of switch modules. A plurality of touch channels are disposed in each touch sub-region. In the plurality of touch wires, an end of each touch wire is electrically connected to a single touch channel, and another end of each touch wire extends to the bonding region. The plurality of switch modules are disposed between the touch region and the bonding region, and for multiple touch wires electrically connected to the plurality of touch channels located in a same touch sub-region, each of at least a part of (Continued)

the multiple touch wires is electrically connected to a switch module.

20 Claims, 14 Drawing Sheets

(52) U.S. Cl.
CPC .......... *G06F 3/0443* (2019.05); *G06F 3/0446* (2019.05); *G06F 2203/04102* (2013.01)

(56) References Cited

U.S. PATENT DOCUMENTS

| | | | |
|---|---|---|---|
| 2021/0019021 A1 | 1/2021 | Zhang | |
| 2023/0097132 A1* | 3/2023 | Yu | G06F 3/0443 345/173 |

FOREIGN PATENT DOCUMENTS

| | | | | |
|---|---|---|---|---|
| CN | 112764590 A | * | 5/2021 | ........... G06F 3/0416 |
| CN | 113010029 A | | 6/2021 | |
| CN | 114115584 A | | 3/2022 | |
| CN | 115458568 A | | 12/2022 | |
| CN | 219068848 U | | 5/2023 | |

* cited by examiner

DISPLAY PANEL, DISPLAY APPARATUS, AND CONTROL METHOD FOR DISPLAY APPARATUS

CROSS-REFERENCE TO RELATED APPLICATIONS

This application is a national phase entry under 35 USC 371 of International Patent Application No. PCT/CN2023/116640, filed on Sep. 4, 2023, which claims priority to Chinese Patent Application No. 202211157563.2, filed on Sep. 22, 2022, each are incorporated herein by reference in their entirety.

TECHNICAL FIELD

The present disclosure relates to the field of display technologies, and in particular, to a display panel, a display apparatus and a control method for a display apparatus.

BACKGROUND

With the continuous development of electronic products, display apparatuses with touch and display functions can achieve simple and flexible human-computer interaction, and thus are widely used.

Active matrix organic light-emitting diode (AMOLED) display apparatuses can achieve full screen, narrow bezel, high resolution, curling wearable, and foldable design, and have become an important development direction in the field of display technologies; and foldable display apparatuses are widely favored.

SUMMARY

In an aspect, a display panel is provided, including a touch region and a peripheral region surrounding the touch region. The peripheral region includes a bonding region located on a side of the touch region, and the touch region includes a plurality of touch sub-regions.

The display panel includes a plurality of touch channels, a plurality of touch wires and a plurality of switch modules.

The plurality of touch channels are disposed in each touch sub-region. In the plurality of touch wires, an end of each touch wire is electrically connected to a single touch channel, and another end of each touch wire extends to the bonding region. The plurality of switch modules are disposed between the touch region and the bonding region, and in the plurality of touch wires, for multiple touch wires electrically connected to the plurality of touch channels located in a same touch sub-region, each of at least a part of the multiple touch wires is electrically connected to a switch module.

The switch module is configured to receive a touch signal and conduct a path of the touch signal in a touch wire, so that touch sensing is performed in a touch sub-region where a touch channel electrically connected to the touch wire is located; or the switch module is configured to disconnect the path of the touch signal transmitted in the touch wire.

In some embodiments, the switch module includes at least one switch transistor; a gate of the switch transistor is configured to receive a switch control signal, a first electrode of the switch transistor is configured to receive the touch signal, and a second electrode of the switch transistor is electrically connected to the touch wire.

In some embodiments, the display panel further includes: a substrate, an active layer, and a gate conductive layer.

The active layer is disposed on the substrate, the active layer includes first active layer patterns located between the touch region and the bonding region, and a first active layer pattern forms a channel, the first electrode, and the second electrode of the switch transistor. The gate conductive layer is stacked with the active layer, the gate conductive layer includes gate conductive patterns located between the touch region and the bonding region, and a gate conductive pattern forms the gate of the switch transistor.

In some embodiments, the display panel further includes a source-drain conductive layer, a first insulating layer, a touch conductive layer, and a second insulating layer.

The source-drain conductive layer is disposed on a side of the active layer and the gate conductive layer away from the substrate, and the source-drain conductive layer includes first connection patterns located between the touch region and the binding region. The first insulating layer is disposed between the source-drain conductive layer and the active layer, the first insulating layer is provided with first via holes therein, and a first connection pattern is electrically connected to the first active layer pattern through a first via hole. The touch conductive layer is disposed on a side of the source-drain conductive layer away from the substrate, and the plurality of touch wires are arranged in the touch conductive layer. The second insulating layer is disposed between the touch conductive layer and the source-drain conductive layer, the second insulating layer is provided with second via holes therein, and the touch wire is electrically connected to the first connection pattern through a second via hole.

In some embodiments, the source-drain conductive layer includes a first source-drain conductive layer and a second source-drain conductive layer; the first connection pattern includes a first connection sub-pattern and a second connection sub-pattern, the first connection sub-pattern is arranged in the first source-drain conductive layer, and the second connection sub-pattern is arranged in the second source-drain conductive layer.

The display panel further includes a third insulating layer disposed between the first source-drain conductive layer and the second source-drain conductive layer, and the third insulating layer is provided with third via holes therein.

The first connection sub-pattern is electrically connected to the first active layer pattern through the first via hole, the second connection sub-pattern is electrically connected to the first connection sub-pattern through a third via hole, and the touch wire is electrically connected to the second connection sub-pattern through the second via hole.

In some embodiments, the touch conductive layer includes a first conductive layer, a fourth insulating layer, and a second conductive layer that are stacked in sequence in a direction away from the substrate.

The touch wire is located in the first conductive layer; or the fourth insulating layer is provided with fourth via holes therein, the touch wire is located in the second conductive layer, and the touch wire is electrically connected to the first connection pattern through a fourth via hole and the second via hole in sequence.

In some embodiments, the display panel further includes touch pins disposed in the bonding region, a touch pin is electrically connected to the switch module, and the touch pin is configured to be bonded to a circuit board.

In some embodiments, touch pins are arranged in the touch conductive layer, and the source-drain conductive layer further includes second connection patterns located on a side of the first connection patterns away from the touch region.

The first insulating layer is further provided with fifth via holes therein, and a second connection pattern is electrically connected to the first active layer pattern through a fifth via hole; the second insulating layer is further provided with sixth via holes therein, and the touch pin is electrically connected to the second connection pattern through a sixth via hole.

In some embodiments, the display panel further includes a control signal line electrically connected to the gate of the switch transistor, the control signal line is configured to transmit the switch control signal to the switch transistor, and the switch control signal is used to control the switch transistor to be turned on or off.

In some embodiments, in a case where the display panel further includes the gate conductive layer and the gate conductive layer includes the gate conductive patterns, the control signal line is arranged in the gate conductive layer, and the control signal line and the gate conductive pattern form a one-piece structure.

In some embodiments, the display panel includes a plurality of control signal lines, and the touch sub-region corresponds to at least one control signal line. For the at least one control signal line and the touch sub-region corresponding to the at least one control signal line, switch transistors connected to a plurality of touch channels located in the touch sub-region are all electrically connected to the at least one control signal line.

In some embodiments, the display panel includes a plurality of switch module groups, each switch module group includes at least one switch module, and the at least one switch module in a same switch module group transmits a same switch control signal. In the plurality of touch sub-regions, each touch sub-region corresponds to at least one switch module in at least one switch module group, and different touch sub-regions correspond to different switch module groups.

In some embodiments, in each touch sub-region, the plurality of touch channels include a plurality of first touch channels and a plurality of second touch channels, and the plurality of first touch channels and the plurality of second touch channels are crossed and insulated from each other. The plurality of touch wires include a plurality of first touch wires and a plurality of second touch wires, in the plurality of first touch wires and the plurality of second touch wires, multiple first touch wires are electrically connected to the plurality of first touch channels, and multiple second touch wires are electrically connected to the plurality of second touch channels.

In each touch sub-region, each of the multiple first touch wires is electrically connected to one switch module, and switch modules connected to the multiple first touch wires are configured to receive a same switch control signal; and/or each of the multiple second touch wires is electrically connected to one switch module, and switch modules connected to the multiple second touch wires are configured to receive a same switch control signal.

In some embodiments, a first touch channel in the plurality of first touch channels extends in a first direction, a second touch channel in the plurality of second touch channels extends in a second direction, and the first direction and the second direction intersect; the plurality of touch sub-regions include a first touch sub-region and a second touch sub-region, and the first touch sub-region and the second touch sub-region are arranged in parallel along the second direction.

In a case where the display panel includes the plurality of switch module groups, first touch wires connected to first touch channels in the first touch sub-region and first touch wires connected to first touch channels in the second touch sub-region are electrically connected to respective switch modules in different switch module groups.

In some embodiments, two second touch channels arranged in parallel along the second direction form a touch queue, and the two second touch channels are respectively arranged in the first touch sub-region and the second touch sub-region.

The two second touch channels belonging to the same touch queue are electrically connected; a second touch wire connected to a second touch channel in the first touch sub-region and a second touch wire connected to a second touch channel in the second touch sub-region both directly receive touch signals; or the two second touch channels belonging to the same touch queue are separately from each other; a second touch wire connected to a second touch channel in the first touch sub-region and a second touch wire connected to a second touch channel in the second touch sub-region are electrically connected to respective switch modules in different switch module groups.

In some embodiments, the peripheral region includes a first peripheral region, a second peripheral region, a third peripheral region, and a fourth peripheral region that are connected in sequence; the first peripheral region and the third peripheral region are arranged opposite to each other, the second peripheral region and the fourth peripheral region are arranged opposite to each other, and the first peripheral region extends in the second direction; and the bonding region is disposed in the fourth peripheral region.

First touch wires electrically connected to a plurality of first touch channels in the first touch sub-region extend to the bonding region through the first peripheral region and/or to the bonding region through the third peripheral region. Among a plurality of second touch channels in the first touch sub-region, second touch wires electrically connected to second touch channels close to the first peripheral region extend to the bonding region through the first peripheral region, and second touch wires electrically connected to second touch channels close to the third peripheral region extend to the bonding region through the third peripheral region.

First touch wires electrically connected to a plurality of first touch channels in the second touch sub-region extend to the bonding region through the first peripheral region and/or to the bonding region through the third peripheral region. Second touch wires electrically connected to a plurality of second touch channels in the second touch sub-region directly extend to the bonding region.

In some embodiments, in a case where the display panel further includes the control signal lines, the control signal lines include the first sub-line, a second sub-line and a third sub-line; in a direction from the first peripheral region to the third peripheral region, the first sub-line, the third sub-line and the second sub-line are arranged in sequence; and the first sub-line and the second sub-line transmit same switch control signals.

Switch modules corresponding to first touch wires extending through the first peripheral region in the first touch wires electrically connected to the plurality of first touch channels in the first touch sub-region, as well as switch modules corresponding to second touch wires electrically connected to second touch channels close to the first peripheral region in the plurality of second touch channels in the first touch sub-region, are all electrically connected to the first sub-line.

Switch modules corresponding to first touch wires extending through the third peripheral region in the first touch wires electrically connected to the plurality of first touch channels in the first touch sub-region, as well as switch modules corresponding to second touch wires electrically connected to second touch channels close to the third peripheral region in the plurality of second touch channels in the first touch sub-region, are all electrically connected to the second sub-line.

Switch modules corresponding to the first touch wires electrically connected to the plurality of first touch channels in the second touch sub-region and switch modules corresponding to the second touch wires electrically connected to the plurality of second touch channels in the second touch sub-region are all electrically connected to the third sub-line.

In another aspect, a display apparatus is provided. The display apparatus includes a touch chip, a timing controller and the display panel as described in any one of the above embodiments.

The touch chip is electrically connected to the plurality of switch modules in the display panel, and the touch chip is configured to transmit touch signals to the plurality of switch modules. The timing controller is electrically connected to the plurality of switch modules, the timing controller is configured to transmit switch control signals to the plurality of switch modules, and a switch control signal is used to control a switch module to be turned on or off.

In some embodiments, the switch control signals transmitted by the timing controller include a first switch control signal and a second switch control signal, the first switch control signal is used to control the switch module to be turned on, and the second switch control signal is used to control the switch module to be turned off.

The display apparatus is capable of being folded along a boundary line of two adjacent touch sub-regions of the display panel. When the display apparatus is unfolded, the timing controller transmits the first switch control signal to switch modules corresponding to the two touch sub-regions, so that the two touch sub-regions perform touch sensing; and when the display apparatus is folded, the timing controller transmits the first switch control signal to switch modules corresponding to one of the two touch sub-regions, and transmits the second switch control signal to switch modules corresponding to another one of the two touch sub-regions, so that the one of the two touch sub-regions performs the touch sensing.

In some embodiments, the display apparatus further includes a circuit board bonded to the display panel, and the touch chip and the timing controller are disposed on the circuit board.

In yet another aspect, a control method for a display apparatus is provided, for controlling the display apparatus as described in any one of the above embodiments. The display apparatus includes a plurality of touch sub-regions, and the display apparatus is capable of being folded along a boundary line between two adjacent touch sub-regions.

The control method includes:
when the display apparatus is in an unfolded state, transmitting, by the timing controller of the display apparatus, a first switch control signal to a plurality of switch modules connected to touch channels in the plurality of touch sub-regions, so that the plurality of switch modules are turned on, and the plurality of touch sub-regions perform touch sensing; and
when the display apparatus is in a folded state, transmitting, by the timing controller, the first switch control signal to multiple switch modules connected to touch channels in a target touch sub-region, so that the multiple switch modules corresponding to the target touch sub-region are turned on, and the target touch sub-region performs the touch sensing; and transmitting, by the timing controller, a second switch control signal to multiple switch modules connected to touch channels in a remaining touch sub-region, so that the multiple switch modules corresponding to the remaining touch sub-region are turned off.

The target touch sub-region is at least one touch sub-region among the plurality of touch sub-regions, and the target touch sub-region is a region of the display apparatus that needs to perform the touch sensing; and the remaining touch sub-region is a touch sub-region among the plurality of touch sub-regions other than the target sub-region.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
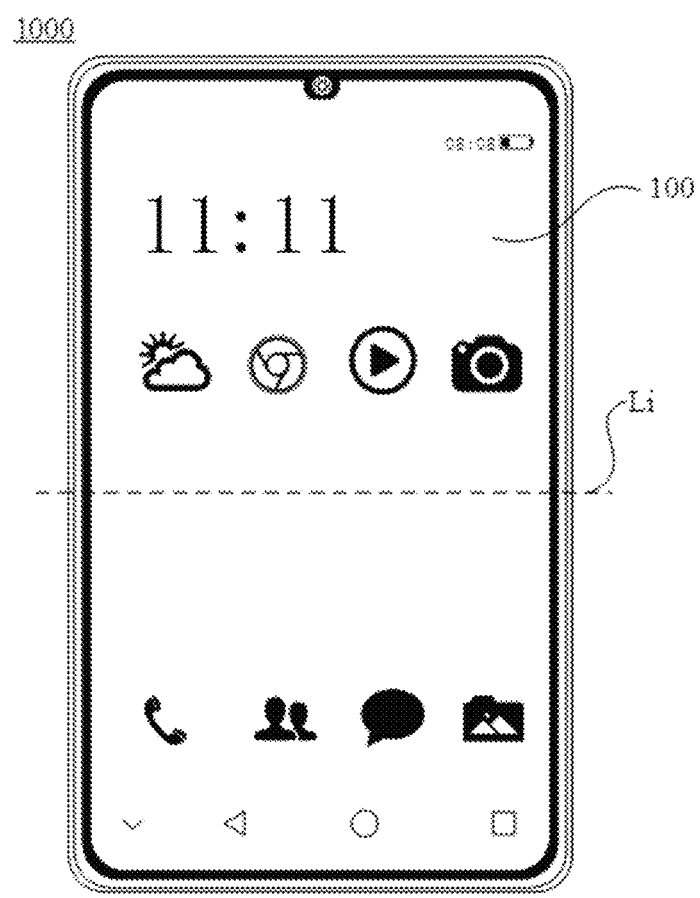
FIG. 1 is a top view of a display apparatus, in accordance with some embodiments.

The technical solutions in some embodiments of the present disclosure will be described clearly and completely with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, the term such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a/the plurality of" means two or more unless otherwise specified.

In the description of some embodiments, the expressions "electrically connected" and "connected" and derivatives thereof may be used. For example, the term "electrically connected" may be used in the description of some embodiments to indicate that two or more components are in direct physical or electrical contact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

In the description of the present disclosure, it should be understood that, orientations or positional relationships indicated by the terms such as "center", "longitudinal", "transverse", "length", "width", "vertical", "horizontal", "inner", and "outer" are based on orientations or positional relationships shown in the drawings, which are only for convenience in the description of the present disclosure and simplifying the description, but not to indicate or imply that the indicated apparatus or element must have a specific orientation, or be constructed and operated in a specific orientation. Therefore, they cannot be construed as limitations of the present disclosure.

It should be understood that, in a case that a layer or element is referred to be on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the drawings, thicknesses of layers and sizes of regions are enlarged for clarity. Thus, variations in shapes relative to the accompanying drawings due to, for example, manufacturing technologies and/or tolerances may be envisaged. Therefore, the exemplary embodiments should not be construed to be limited to shapes of regions shown herein, but to include deviations in the shapes due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments FIG. 1 is a top view of a display apparatus 1000 provided in some embodiments of the present disclosure. The display apparatus 1000 may be any apparatus that displays images whether in motion (e.g., videos) or stationary (e.g., static images), and whether textual or graphical. More specifically, it is expected that the embodiments may be implemented in or associated with a variety of electronic apparatuses. The variety of electronic apparatuses may include (but not limited to), for example, a mobile phone, a wireless apparatus, a personal digital assistant (PDA), a virtual reality (VR) display, a hand-held or portable computer, a global positioning system (GPS) receiver/navigator, a camera, an MP4 video player, a video camera, a game console, a watch, a clock, a calculator, a television monitor, a flat panel display, a computer monitor, an automobile display (e.g., an odometer display), a navigator, a cockpit controller and/or display, a display of camera views (e.g., a display of a rear-view camera in a vehicle), an electronic photo, an electronic billboard or sign, a projector, a building structure, a packaging and aesthetic structure (e.g., a display for displaying an image of a piece of jewelry), etc.

Figure 2:
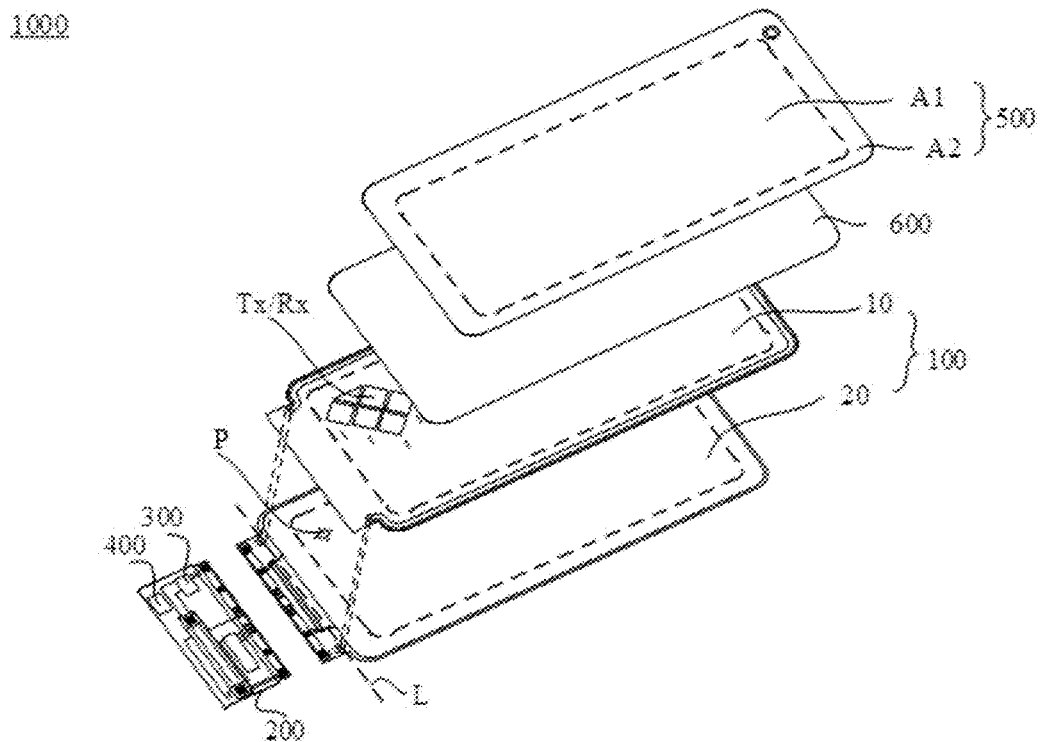
FIG. 2 is an exploded view of a display apparatus, in accordance with some embodiments.

In some embodiments, as shown in FIG. 2, the display apparatus 1000 may include a display panel 100.

The display panel 100 may be a liquid crystal display (LCD) panel, or the display panel 100 may be an electroluminescent display panel or a photoluminescent display panel. In the case where the display panel 100 is the electroluminescent display panel, the electroluminescent display panel may be an organic electroluminescent display panel (organic light-emitting diode (OLED) display panel) or a quantum dot electroluminescent display panel (quantum dot light-emitting diode (QLED) display panel). In the case where the display panel 100 is the photoluminescent display panel, the photoluminescent display panel may be a quantum dot photoluminescent display panel.

Referring to FIG. 2, the display panel 100 includes a touch conductive layer 10 and a light-emitting substrate 20. The light-emitting substrate 20 is provided with a plurality of sub-pixels P for achieving light-emitting display of the display panel 100. A plurality of touch electrodes (including first touch electrodes Tx and second touch electrodes Rx) are disposed in the touch conductive layer 10 for achieving touch sensing of the display panel 100.

The display panel 100 has a display surface and a non-display surface, where the display surface is a surface of the display panel 100 for light-emitting display, and the non-display surface is a surface of the display panel 100 facing away from the display surface.

In some embodiments, as shown in FIG. 2, the display apparatus 1000 further includes a circuit board 200.

The circuit board 200 is configured to be bonded and connected to the display panel 100. Referring to FIG. 2, the display panel 100 may be bent along the dotted line L toward the non-display surface of the display panel 100, so that the circuit board 200 is located at the back of the display panel 100.

For example, the circuit board 200 includes a flexible circuit board and a printed circuit board, and the flexible circuit board is bonded and electrically connected to the display panel 100 and the printed circuit board.

For example, the circuit board 200 may be a rigid-flexible board. That is, the circuit board 200 may include both a flexible and foldable region and a rigid and printable region, which has the characteristics of both the flexible circuit board and the printed circuit board.

In some embodiments, as shown in FIG. 2, the display apparatus 1000 may further include a touch chip 300.

Figure 7:
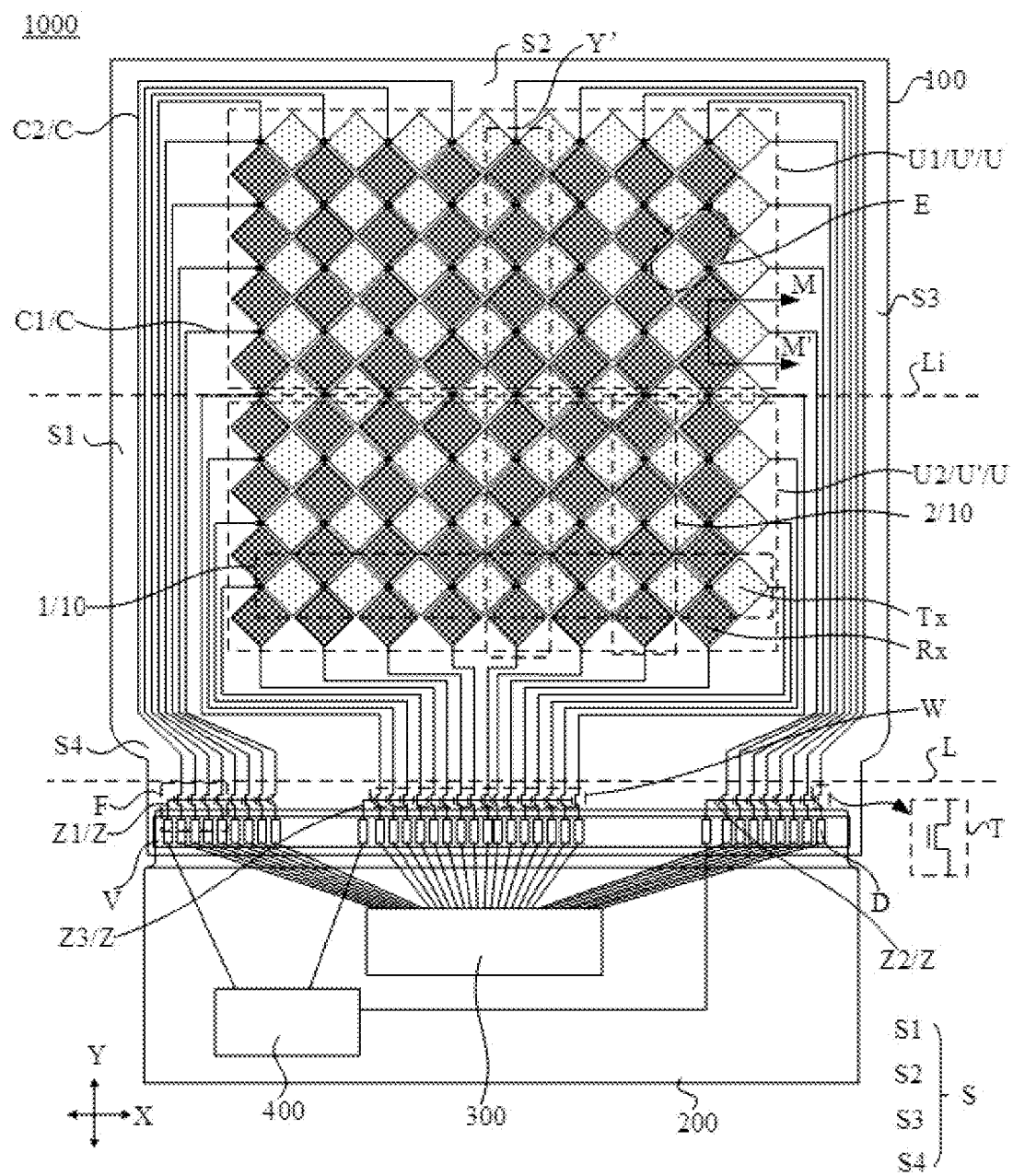
FIG. 7 is a top view of another display apparatus, in accordance with some embodiments.

The touch chip 300 is configured to be electrically connected to the touch electrodes (e.g., the first touch electrodes Tx and the second touch electrodes Rx shown in FIG. 7) in the display panel 100, so as to transmit touch signals to the touch electrodes to implement the touch function of the display panel 100.

For example, the touch chip 300 is electrically connected to a switch module T (see FIG. 7) in the display panel 100, and the touch chip 300 is configured to transmit a touch signal to the switch module T. Thus, in a case where the switch module T is turned on, the touch signal can be transmitted to a touch electrode through a touch wire C (see FIG. 7).

In some embodiments, as shown in FIG. 2, the display apparatus 1000 further includes a timing controller 400.

The timing controller 400 is configured to control the transmission of control signals to the display panel 100, thereby controlling the light emitted from the sub-pixels P of the display panel 100 and controlling the touch conductive layer 10 of the display panel 100.

For example, the timing controller 400 is electrically connected to the switch module T (see FIG. 7), and is configured to transmit a switch control signal to the switch module T. The switch control signal is used for controlling the switch module T to be turned on or off, so that the touch signal may be controlled to be transmitted in the touch conductive layer 10.

For example, the timing controller 400 is further electrically connected to a thin film transistor TFT (see FIG. 6) in the display panel 100. In this case, the timing controller 400 is further configured to transmit a timing signal to the thin film transistor TFT, so that the thin film transistor TFT controls a light-emitting device La (see FIG. 6) to emit light, thereby achieving the light-emitting control of the sub-pixel P.

For example, the switch control signal transmitted by the timing controller 400 includes a first switch control signal and a second switch control signal, the first switch control signal is used for controlling the switch module T (see FIG. 7) to be turned on, and the second switch control signal is used for controlling the switch module T to be turned off.

For example, the first switch control signal may be a low-level voltage signal, and the second switch control signal may be a high-level voltage signal.

In some embodiments, as shown in FIG. 2, the touch chip 300 and the timing controller 400 are disposed on the circuit board 200.

For example, in the case where the circuit board 200 includes the flexible circuit board and the printed circuit board, the touch chip 300 is disposed on the flexible circuit board, and the timing controller 400 is disposed on the printed circuit board.

For example, in the case where the circuit board 200 is the rigid-flexible board, the touch chip 300 and the timing controller 400 are both disposed on the rigid-flexible board.

In some embodiments, as shown in FIG. 2, the display apparatus 1000 may further include a cover plate 500 and a polarizer 600 located between the cover plate 500 and the display panel 100.

The polarizer 600 is configured to reduce reflected light from external light after being reflected by the metal structure in the display panel 100. The polarizer 600 and the cover plate 500 are adhered together by optical adhesive.

As shown in FIG. 2, the cover plate 500 may include a light-transmitting region A1 and a light-shielding region A2. The light-transmitting region A1 may at least partially overlap with the display region (the region for effective light-emitting display) of the display panel 100, and light emitted from the display panel 100 may pass through the light-transmitting region A1 of the cover plate 500 and exit to the outside, so as to be seen by human eyes. The light-shielding region A2 may be disposed at the periphery of the light-transmitting region A1 and may at least partially overlap with the peripheral region (surrounding the display region) of the display panel 100, which may effectively shield wires of the display panel 100 in the peripheral region.

In some embodiments, the display apparatus 1000 may further include a rear shell. For example, the rear shell may have a U-shaped depression, the rear shell and the cover plate 500 are combined to form a frame of the display apparatus 1000, and the display panel 100, the bent flexible circuit board and other components are all arranged in the frame.

The display apparatus 1000 can be folded for use, and the specific folding method is as follows.

Figure 3:
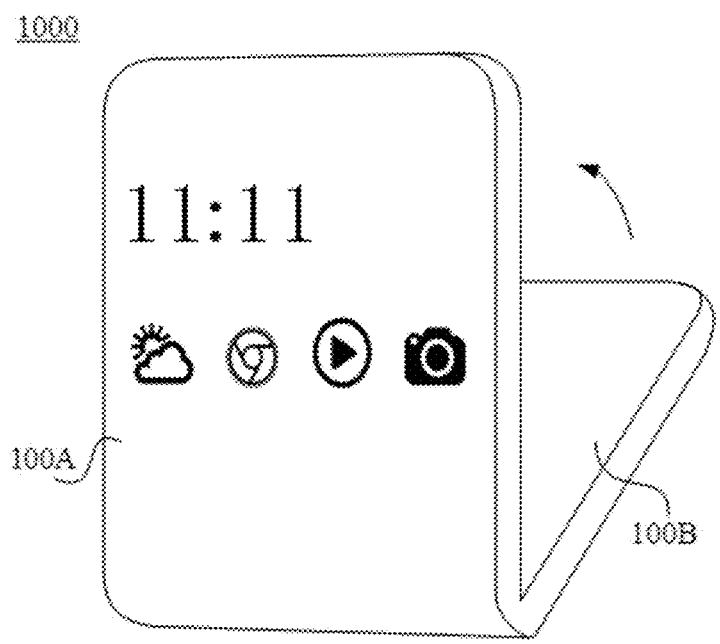
FIG. 3 is a folded view of a display apparatus, in accordance with some embodiments.

FIG. 3 shows a structural diagram of the display apparatus 1000 after being folded along the dotted line Li in FIG. 1. As shown in FIG. 3, the display apparatus 1000 can be divided into two screens (an upper half screen 100A and a lower half screen 100B) after being folded.

The dotted line Li may be a boundary line between two adjacent touch sub-regions U' of the display panel 100 of the display apparatus 1000 (for example, a boundary line between a first touch sub-region U1 and a second touch sub-region U2 in FIG. 7).

For example, FIG. 3 only illustrates an exemplary folding angle of the display apparatus 1000 (for example, being folded at 120° along the dotted line Li in FIG. 1). The embodiments of the present disclosure do not limit the folding angle of the display apparatus 1000. For example, the display apparatus 1000 can be folded at 90° (that is, an angle between the upper half screen and the lower half screen is 90°), 30°, 53°, 120.5° or 180°.

Figure 4:
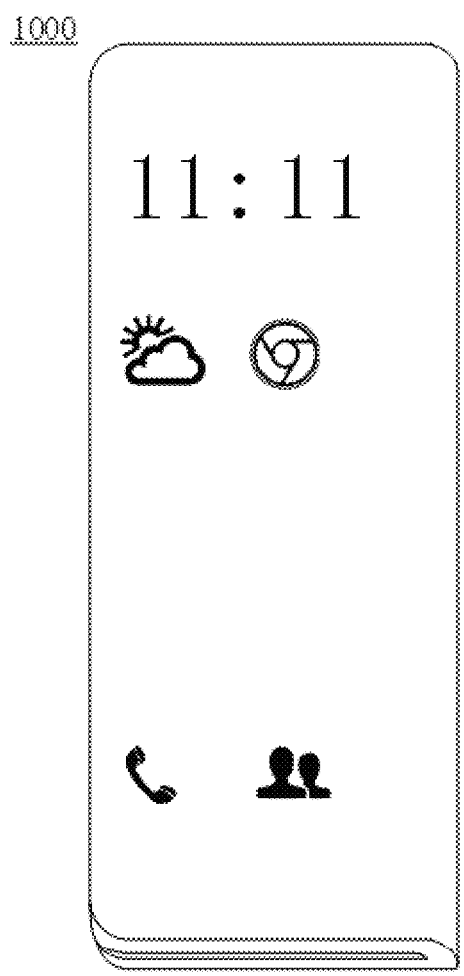
FIG. 4 is a folded view of another display apparatus, in accordance with some embodiments.

It should be noted that the embodiments of the present disclosure only illustrate the exemplary folding position and folding method of the display apparatus 1000. For example, in FIG. 3, the folding position of the display apparatus 1000 is that the display apparatus 1000 is folded along the dotted line Li, and the folding method is that the upper half screen 100A and the lower half screen 100B are folded with each other. The embodiments of the present disclosure do not limit this. For example, in FIG. 4, the display apparatus 1000 can also be folded along a center line of the display apparatus 1000 perpendicular to the dotted line Li, and the display apparatus 1000 is divided into a left half screen and a right half screen. Alternatively, in other embodiments, the display apparatus 1000 can also be folded along two straight lines perpendicular to the dotted line Li, so that the display apparatus 1000 is divided into three sub-screens: a left screen, a middle screen, and a right screen.

In the unfolded state of the display apparatus 1000 as shown in FIG. 1, the entire screen of the display apparatus 1000 is in a touch-sensitive state, which means that the entire screen of the display apparatus 1000 is in a usable state; and when any position of the screen is touched with a finger or a stylus, the corresponding display or control function of the display apparatus 1000 can be achieved.

For example, in this case, referring to FIG. 7, the timing controller 400 transmits first switch control signals to switch modules T corresponding to the two adjacent touch sub-regions U' located on both sides of the dotted line Li, so that the two adjacent touch sub-regions U' can both perform touch sensing, and full-screen touch of the display apparatus 1000 is achieved.

In the folded state of the display apparatus 1000 as shown in FIG. 3, or in the folded state at other folding angles, the entire screen of the display apparatus 1000 may also be in the touch-sensitive state; or only one of the upper half screen 100A and the lower half screen 100B of the display apparatus 1000 may be in the touch-sensitive state, and the other may be in a sleep state.

For example, in this case, referring to FIG. 7, the timing controller 400 transmits a first switch control signal to the switch module T corresponding to one (e.g., the first touch sub-region U1) of the two adjacent touch sub-regions U' located on both sides of the dotted line Li, and transmits a second switch control signal to the switch module T corresponding to the other (e.g., the second touch sub-region U2) of the two adjacent touch sub-regions U', so that one (e.g., the first touch sub-region U1) of the two adjacent touch sub-regions U' performs touch sensing, and the other is in the sleep state.

For example, in the folded state of the display apparatus 1000 shown in FIG. 3, the upper half screen 100A of the display apparatus 1000 is in the touch-sensitive state, and the lower half screen 100B is in the sleep state. When the upper half screen 100A is touched by a finger or a stylus, the upper half screen 100A may achieve the corresponding display or control function. When the lower half screen 100B is touched by a finger or a stylus, the lower half screen 100B does not respond. Thus, split-screen control of the upper half screen 100A and the lower half screen 100B of the display apparatus 1000 is achieved.

By performing the split-screen control on the folded screen of the display apparatus 1000 when the display apparatus 1000 is in the folded state, the power consumption of the screen that is not in use may be reduced, and in addition, accidental touches on the screen that is not in use may be prevented.

Figure 5:
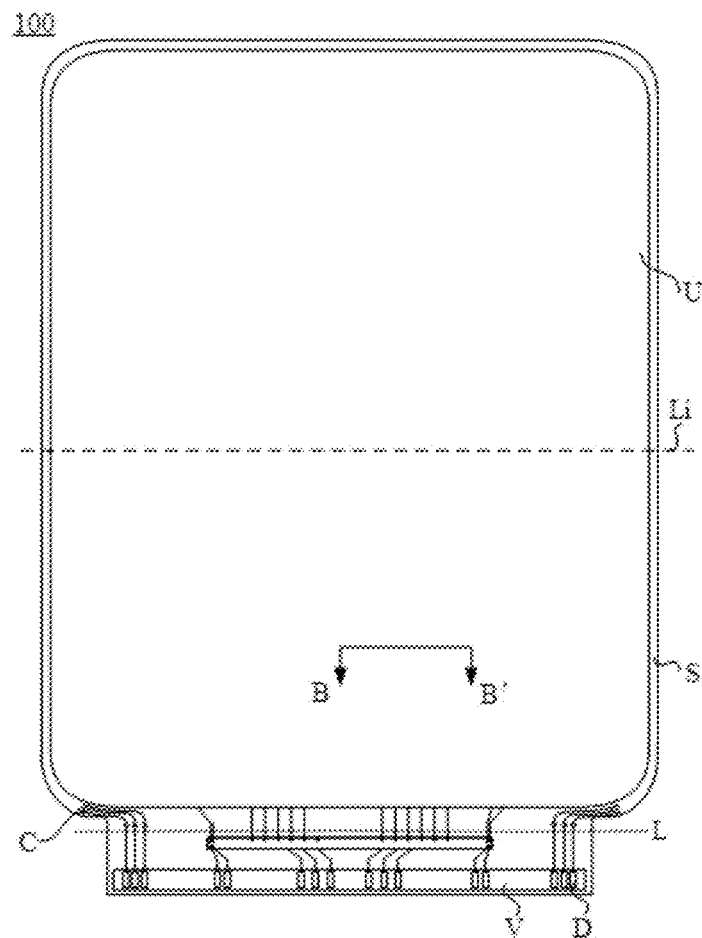
FIG. 5 is a top view of a display panel, in accordance with some embodiments.

In order to achieve the split-screen control of the display apparatus 1000 in the folded state, as shown in FIG. 5, the display panel 100 also needs to be folded and unfolded along the dotted line Li accordingly.

In some embodiments, as shown in FIG. 5, the display panel 100 has a touch region U and a peripheral region S surrounding the touch region U.

The touch region U is configured to be provided with the plurality of touch electrodes (including the first touch electrode Tx and the second touch electrode Rx as shown in FIG. 7). That is, the touch region U is an effective touch region of the touch conductive layer 10 of the display panel 100.

The peripheral region S serves as a wiring region of the display panel 100 and provides wiring space for various signal lines (such as touch wires C shown in FIGS. 5 and 7).

As shown in FIG. 5, the peripheral region S further includes a bonding region V, and the bonding region V is located on a side of the touch region U.

Referring to FIG. 5, the bonding region V is configured to be bonded and connected to the circuit board 200. The plurality of touch wires C in the display panel 100 are finally extended to the bonding region V and exposed in the bonding region V, and the exposed portions serve as bonding pins D to facilitate bonding and connection with the circuit board 200. Thus, the plurality of touch wires C are electrically connected to the touch chip 300 on the circuit board 200, so as to achieve the touch function of the display panel 100.

Figure 6:
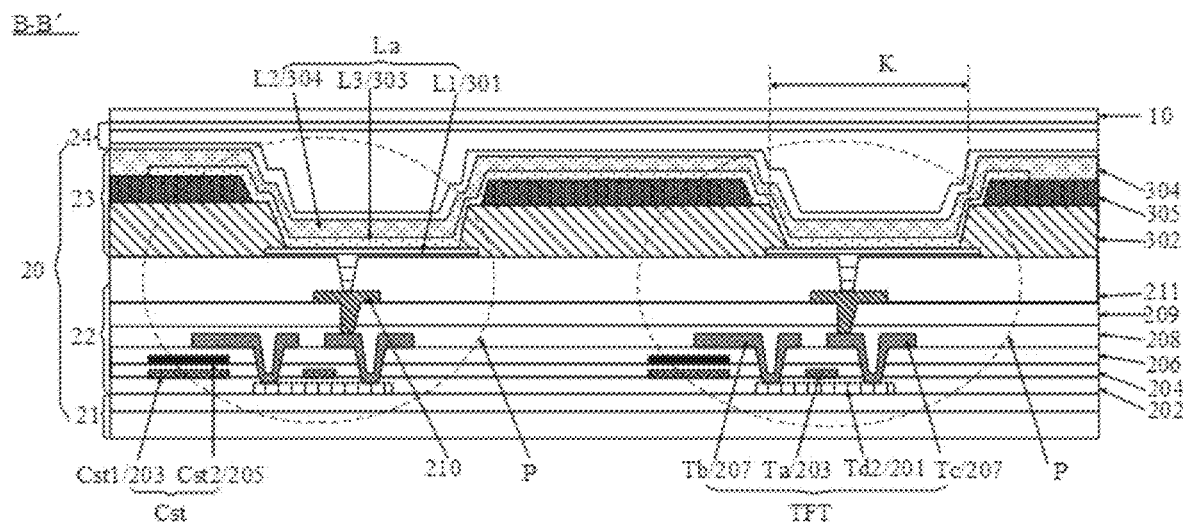
FIG. 6 is a sectional view taken along the section line B-B' shown in FIG. 5.

In some embodiments, as shown in FIG. 6, the display panel 100 includes a touch conductive layer 10 and a light-emitting substrate 20.

Referring to FIG. 6, the light-emitting substrate 20 includes a substrate 21, and a pixel circuit layer 22 and a light-emitting device layer 23 that are stacked on the substrate 21.

The substrate 21 may be of a single-layer structure or a multi-layer structure. For example, the substrate 21 includes a flexible base and a buffer layer that are stacked in sequence. For another example, the substrate 21 includes a plurality of flexible bases and a plurality of buffer layers that are alternately arranged. A material of the flexible base may include polyimide, and a material of the buffer layer may include silicon nitride and/or silicon oxide, so as to achieve an effect of blocking moisture, oxygen and alkaline ions.

The pixel circuit layer 22 includes an active layer 201, a first gate insulating layer 202, a first gate conductive layer 203, a second gate insulating layer 204, a second gate conductive layer 205, an interlayer dielectric layer 206, a first source-drain conductive layer 207, a passivation layer 208, a first planarization layer 209, a second source-drain conductive layer 210 and a second planarization layer 211 that are stacked on the substrate 21 in sequence.

Optionally, there is only one source-drain conductive layer (e.g., only the first source-drain conductive layer 207 or only the second source-drain conductive layer 210), and accordingly, there is only one planarization layer (e.g., only the first planarization layer 209 or only the second planarization layer 211).

The pixel circuit layer 22 is provided with a plurality of thin film transistors TFT and a plurality of capacitor structures Cst. Each sub-pixel P correspondingly includes at least one thin film transistor TFT and at least one capacitor structure Cst. For example, only two thin film transistors TFT and two corresponding capacitor structures Cst are shown in FIG. 6.

The thin film transistor TFT includes a gate Ta, a source Tb, a drain Tc and a second active layer pattern Td2. The source Tb and the drain Tc are in electrical contact with the second active layer pattern Td2.

The second active layer pattern Td2 is configured to, under control of the gate Ta, form a channel, which conducts the source Tb and the drain Tc that are connected to the second active layer pattern Td2, so that the thin film transistor TFT is turned on. For example, the thin film transistor TFT further includes a portion of the first gate insulating layer 202 located between a film layer where the gate Ta is located and a film layer where the second active layer pattern Td2 is located.

It should be noted that, a control electrode of each thin film transistor TFT is the gate Ta of the thin film transistor TFT, a first electrode of each thin film transistor TFT is one of the source Tb and the drain Tc of the thin film transistor TFT, and a second electrode of each thin film transistor TFT is the other one of the source Tb and the drain Tc of the thin film transistor TFT. Since the source Tb and the drain Tc of the thin film transistor TFT may be symmetrical in structure, there may be no difference in structure between the source Tb and the drain Tc.

The capacitor structure Cst includes a first electrode plate Cst1 and a second electrode plate Cst2, the first electrode plate Cst1 is located in the first gate conductive layer 203, and the second electrode plate Cst2 is located in the second gate conductive layer 205.

The light-emitting device layer 23 includes an anode layer 301, a pixel defining layer 302, a light-emitting functional layer 303, and a cathode layer 304 that are sequentially stacked on a side of the pixel circuit layer 22 away from the substrate 21.

The light-emitting device layer 23 is provided with a plurality of light-emitting devices La. Each sub-pixel P correspondingly includes a light-emitting device La. The light-emitting device La includes an anode L1 located in the anode layer 301, a cathode L2 located in the cathode layer 304, and a light-emitting pattern L3 located in the light-emitting functional layer 303.

The anode L1 located in the anode layer 301 is configured to transmit a high-level voltage (e.g., a power supply voltage signal VDD), and the cathode L2 located in the cathode layer 304 is configured to transmit a low-level voltage (e.g., a cathode voltage signal VSS). Under the action of the electric field formed by the anode L1 and the cathode L2, the light-emitting pattern L3 can emit light.

For example, in addition to the light-emitting pattern L3, the light-emitting function layer 303 further includes one or more layers of an electron transport layer (ETL), an electron injection layer (EIL), a hole transport layer (HTL), and a hole injection layer (HIL).

For example, the anode L1 may be electrically connected to the source Tb or the drain Tc of the thin film transistor TFT, so that the light-emitting device La can emit light under the control of the thin film transistor TFT.

For example, as shown in FIG. 6, the pixel defining layer 302 is provided therein with a plurality of openings K, at least a portion of the light-emitting pattern L3 is located in an opening K, and light emitted by the light-emitting pattern L3 exits to the outside through the opening K.

For example, as shown in FIG. 6, a supporting layer 305 may be provided between the pixel defining layer 302 and the cathode layer 304. The supporting layer 305 may support a protective film layer, so as to prevent contact between the protective film layer and the anode layer 301 or contact between the protective film layer and other wires, which causes the anode layer 301 or other wires to be broken.

For example, as shown in FIG. 6, the light-emitting substrate 20 further includes an encapsulation layer 24 disposed on a side of the light-emitting devices L away from the substrate 21. The encapsulation layer 24 may include a first encapsulation sub-layer, a second encapsulation sub-layer, and a third encapsulation sub-layer that are sequentially stacked in a direction away from the substrate 21. For example, a material of the first encapsulation sub-layer and a material of the third encapsulation sub-layer each include an inorganic material, and a material of the second encapsulation sub-layer includes an organic material. The first encapsulation sub-layer and the third encapsulation sub-layer have a function of blocking water vapour and oxygen, and the second encapsulation sub-layer has certain flexibility and a function of absorbing water vapour.

The light-emitting substrate 20 has a light-exit surface and a backlight surface, the light-exit surface refers to a surface of the light-emitting substrate 20 for emitting light, and the backlight surface refers to a surface of the light-emitting substrate 20 facing away from the light-exit surface.

Referring to FIG. 6, the touch conductive layer 10 is disposed on the light-exit surface of the light-emitting substrate 20.

The touch conductive layer 10 may be configured to sense user's touch and obtain touch information, for example, sense the user's finger touch or stylus touch, and obtain touch coordinate information, thereby achieving the touch function of the display panel 100.

In some embodiments, the touch conductive layer 10 may be formed as a separate element, and the touch conductive layer 10 may be adhered to the light-emitting substrate 20 using an adhesive layer. In the case where the touch conductive layer 10 forms the separate element (e.g., the separate film layer), the touch conductive layer 10 may further include a carrier film for carrying the touch electrodes.

For example, the carrier film may be at least one of a resin film, a glass base, and a composite film.

For example, the adhesive layer may be at least one of a pressure sensitive adhesive (PSA), an optical clear adhesive (OCA), and an optical clear resin (OCR).

In some other embodiments, the touch conductive layer 10 may be directly disposed on the light-emitting substrate 20, for example, directly disposed on the encapsulation layer 24 of the light-emitting substrate 20. That is, no other film layer is disposed between the touch conductive layer 10 and the encapsulation layer 24. For example, the touch conductive layer 10 may be formed on the encapsulation layer 24 of the light-emitting substrate 20 through a continuous process. That is, the touch conductive layer 10 may be directly formed on the encapsulation layer 24 after the encapsulation layer 24 of the light-emitting substrate 20 is formed, which is beneficial to obtaining the display apparatus 1000 with a lighter weight and a thinner thickness through fabrication and has good application prospects.

In some embodiments, as shown in FIG. 7, the touch conductive layer 10 includes a plurality of first touch channels 1 and a plurality of second touch channels 2.

Each first touch channel 1 extends in a first direction X, and each second touch channel 2 extends in a second direction Y.

The first direction X and the second direction Y intersect. For example, the first direction X and the second direction Y are perpendicular to each other.

It should be noted that, the first direction X may be a horizontal direction of the display apparatus 1000, and the second direction Y may be a vertical direction of the display apparatus 1000; or the first direction X may be a row direction of an array in which the plurality of sub-pixels P are arranged, and the second direction Y may be a column direction of the array in which the plurality of sub-pixels P are arranged.

The drawings of the present disclosure are illustrated only by taking an example in which the first direction X is the row direction, and the second direction Y is the column direction. In the embodiments of the present disclosure, technical solutions obtained by rotating the drawings at a certain angle (e.g., 30 degrees, 45 degrees, or 90 degrees) shall also be included in the protection scope of the present disclosure.

For example, referring to FIG. 7, each first touch channel 1 includes a plurality of first touch electrodes Tx arranged in the first direction X and connected in series, and each second touch channel 2 includes a plurality of second touch electrodes Rx arranged in the second direction Y and connected in series.

The plurality of first touch channels 1 and the plurality of second touch channels 2 are insulated from each other. Furthermore, the plurality of first touch channels 1 and the plurality of second touch channels 2 intersect each other, so that the first touch electrodes Tx and the second touch electrodes Rx are insulated and alternately arranged.

For example, as shown in FIG. 7, the first touch electrodes Tx and the second touch electrodes Rx are alternately arranged, and adjacent different touch electrodes (i.e., first touch electrodes Tx and second touch electrodes Rx) are insulated and can generate mutual capacitance. The mutual capacitance values of these touch electrodes will change after being touched. The amount of change in the mutual capacitance values before and after the touch may be determined by detecting the mutual capacitance values to determine the touch position, achieving the touch effect of the touch conductive layer 10.

Figure 8:
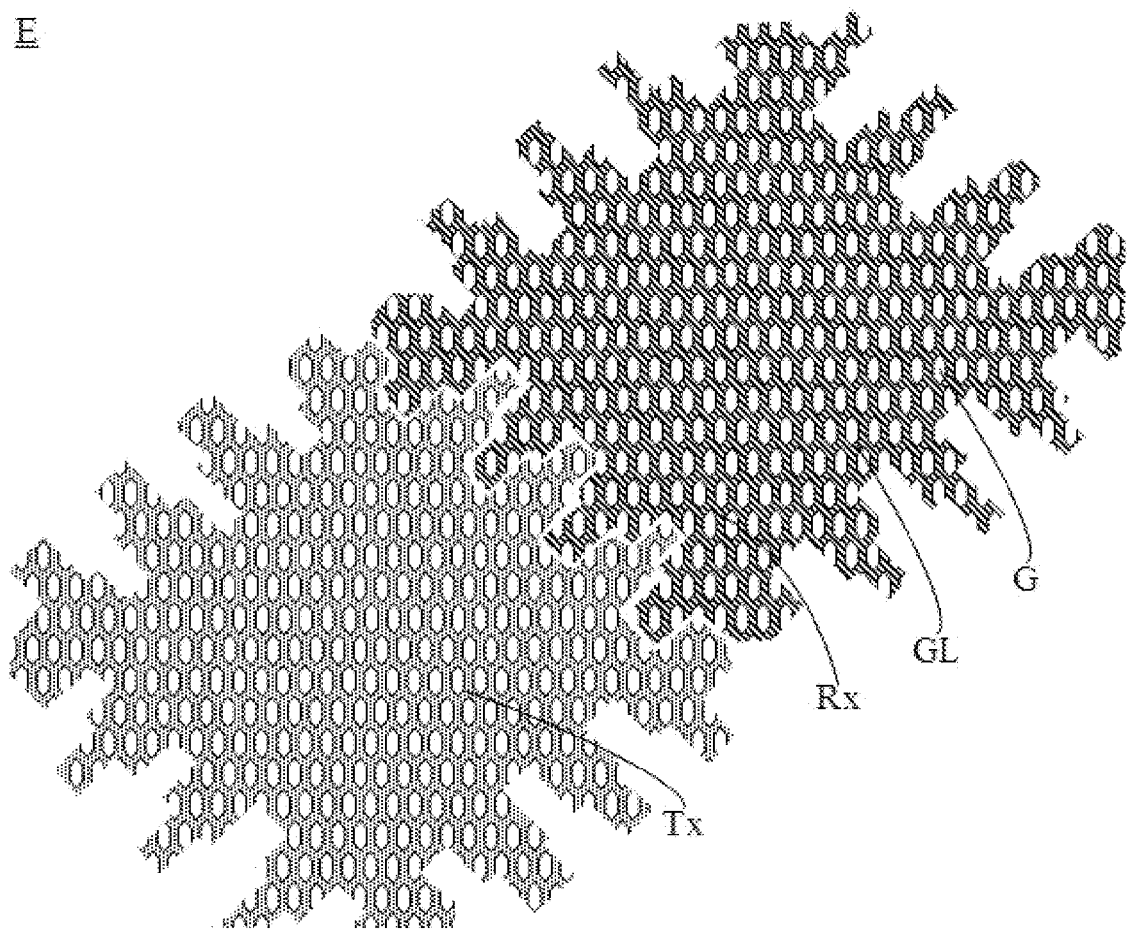
FIG. 8 is an enlarged diagram of a structure corresponding to a region where the dashed box E in FIG. 7 is located.

For example, as shown in FIG. 8, the touch conductive layer 10 of the display apparatus 1000 includes a plurality of metal lines GL, and the plurality of metal lines GL intersect each other to form a plurality of metal grids G.

For example, as shown in FIG. 8, in the touch conductive layer 10, the touch electrodes (including the first touch electrodes Tx and the second touch electrodes Rx) adopt a metal grid structure (i.e., include metal grids G). Compared with using indium tin oxide (ITO) to form planar electrodes as touch electrodes, the touch electrodes with the metal grid structure have a small resistance and a high sensitivity, and can improve the touch sensitivity of the touch conductive layer 10. Furthermore, the touch electrodes with the metal grid structure have high mechanical strength, which can reduce the weight of the touch conductive layer 10. When the touch conductive layer 10 is applied to the display apparatus 1000, the display apparatus 1000 can be made thin and light.

For example, as shown in FIG. 8, the first touch electrodes Tx and the second touch electrodes Rx each have a metal grid structure. The metal grids G of the first touch electrodes Tx and the second touch electrodes Rx may be arranged in the same film layer, and the metal grids G of the first touch electrodes Tx are disconnected from the metal grids G of the second touch electrodes Rx, so that the first touch electrodes Tx and the second touch electrodes Rx are insulated from each other.

It should be noted that, the metal grids G in FIG. 8 are filled with different patterns in order to distinguish different touch electrodes. The metal grids G of the first touch electrodes Tx and the second touch electrodes Rx may be made of the same material and formed using the same process.

For example, as shown in FIG. 8, shapes of the first touch electrodes Tx and the second touch electrodes Rx are rhombic or substantially rhombic. Here, "substantially rhombic" means that the touch electrode (i.e., the first touch electrode Tx or the second touch electrode Rx) is in a shape of a rhombus as a whole, but is not limited to a standard rhombus. For example, a border of the touch electrode is allowed to be non-linear (such as sawtooth-shaped). For example, the shape of the touch electrode involved in the following embodiments is in a shape of a rhombus as a whole, but its border is sawtooth-shaped.

Furthermore, in the embodiments of the present disclosure, the shapes of the electrode patterns of the first touch electrodes Tx and the second touch electrodes Rx are not limited to be rhombic or substantially rhombic, and may also be, for example, rectangular, strip-shaped, etc.

For example, according to different crossing modes of the metal lines GL, the shape of a metal grid G may be substantially hexagonal, rectangular, or irregular polygonal.

Figure 9:
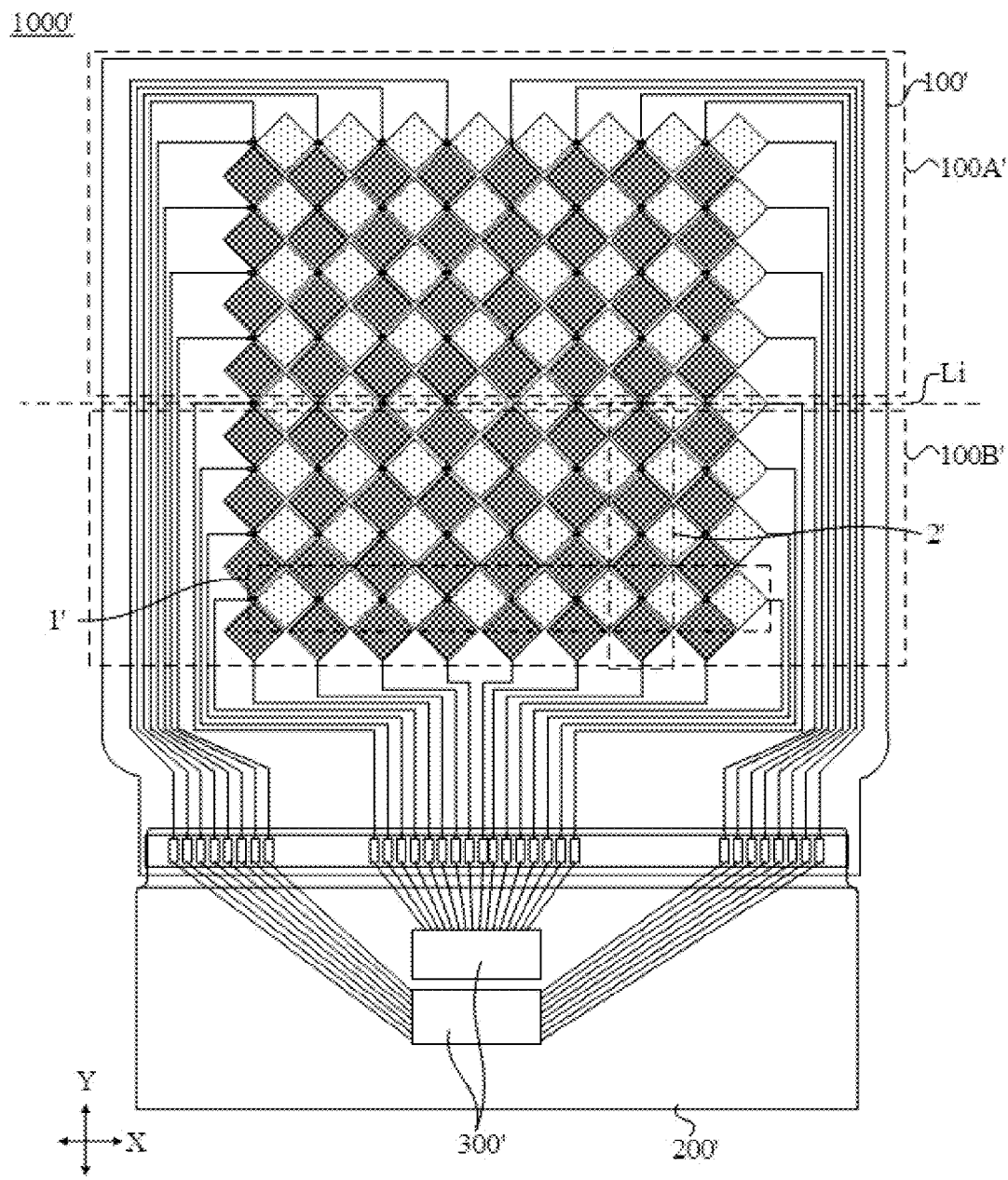
FIG. 9 is a top view of yet another display apparatus, in accordance with some embodiments.

With the continuous development of display technology, the foldable display apparatus 1000' has gained wide popularity. As shown in FIG. 9, in the related art, the display panel 100' may be folded along the dotted line Li, so that the display panel 100' is divided into an upper half screen 100A' relatively far away from the circuit board 200', and a lower half screen 100B' relatively close to the circuit board 200'.

When the display panel 100' is unfolded, both the upper half screen 100A' and the lower half screen 100B' may be touch-sensitive. When the display panel 100' is folded and only the upper half screen 100A' or only the lower half screen 100B' is used, one of the upper half screen 100A' and the lower half screen 100B' that needs to be used may be touch-sensitive, and the touch function of the other one of the upper half screen 100A' and the lower half screen 100B' needs to be turned off. That is, split-screen control needs to be performed on the display panel 100').

Referring to FIG. 9, in the related art, the second touch channel 2' located in the upper half screen 100A' is disconnected from the second touch channel 2' located in the lower half screen 100B' at the folding position (for example, disconnected along the dotted line Li), and the touch channels located in the upper half screen 100A' (including the first touch channels 1' and the second touch channels 2') and the touch channels located in the lower half screen 100B' are respectively electrically connected to different touch chips 300', thereby achieving the split-screen control of the upper half screen 100A' and the lower half screen 100B' through different touch chips 300'.

However, as shown in FIG. 9, the circuit board 200' of the display apparatus 1000' in the related art needs to be provided with multiple touch chips 300' (e.g., two touch chips 300' shown in FIG. 9) corresponding to multiple folding screens. On one hand, the circuit board 200' in the foldable display apparatus 1000' needs to be specially designed, and the circuit board used in the traditional non-foldable display apparatus (only one touch chip is designed) cannot be utilized. On the other hand, the touch chip 300' is relatively expensive, and the circuit board 200' provided with multiple touch chips 300' results in a significant increase in the fabrication cost of the display apparatus 1000'.

In order to solve the above technical problems, embodiments of the present disclosure provide a display panel 100.

As shown in FIG. 7, the display panel 100 includes a touch region U and a peripheral region S surrounding the touch region U. The peripheral region S includes a bonding region V, and the bonding region V is located on a side of the touch region U.

Referring to FIG. 7, the touch region U includes a plurality of touch sub-regions U'. For example, referring to FIG. 7, the touch region U includes a first touch sub-region U1 and a second touch sub-region U2, and the first touch sub-region U1 and the second touch sub-region U2 are arranged along the second direction Y.

The display panel 100 may be folded along a boundary line between the two adjacent touch sub-regions U'. For example, referring to FIG. 7, in the case where the touch region U includes the first touch sub-region U1 and the second touch sub-region U2, the display panel 100 may be folded along the dotted line Li.

Referring to FIG. 7, the display panel 100 includes touch channels (including first touch channels 1 and second touch channels 2), a plurality of touch wires C, and a plurality of switch modules T.

Referring to FIG. 7, a plurality of touch channels are disposed in each touch sub-region U'. That is, each touch sub-region U' is provided with a plurality of touch channels therein, so that each touch sub-region U' can have the capability of touch sensing.

For example, referring to FIG. 7, the first touch sub-region U1 and the second touch sub-region U2 each is provided with a plurality of first touch channels 1 and a plurality of second touch channels 2 therein.

Referring to FIG. 7, among the plurality of touch wires C, one end of each touch wire C is electrically connected to a single touch channel, and the other end of each touch wire C extends to the bonding region V.

For example, after the touch wire C extends to the bonding region V, its end is exposed in the bonding region V, and the exposed portion forms a touch pin D for easy bonding to the circuit board 200. Thus, the touch channel electrically connected to the touch wire C is connected to the touch chip 300 on the circuit board 200, so as to achieve the touch function of the display apparatus 1000.

For example, referring to FIG. 7, the touch wires C include first touch wires C1 and second touch wires C2; one end of a first touch wire C1 is electrically connected to a single first touch channel 1, and the other end of the first touch wire C1 extends to the bonding region V; one end of a second touch wire C2 is electrically connected to a single second touch channel 2, and the other end of the second touch wire C2 extends to the bonding region V.

Referring to FIG. 7, the display panel 100 further includes the plurality of switch modules T. The plurality of switch modules T are disposed between the touch region U and the bonding region V.

The switch module T is configured to receive a touch signal and conduct a path of the touch signal in the touch wire C, so that the touch sensing is performed in the touch sub-region U' where the touch channel electrically connected to the touch wire C is located; or the switch module T is configured to disconnect the path of the touch signal transmitted in the touch wire C.

For example, when the switch module T is turned on, the touch signal can be smoothly sent by the touch chip 300 on the circuit board 200, and pass through the touch pin D bonded to the circuit board 200 in the bonding region V, the switch module T in the on state, and the touch wire C electrically connected to the switch module T in sequence, and be finally transmitted to the touch channel electrically connected to the touch wire C through the touch wire C. That is, the transmission path of the touch signal is in the on state, so that the touch sensing is achieved in the touch sub-region U' where the touch channel is located.

When the switch module T is turned off, the path for transmitting the touch signal is disconnected. That is, the touch signal cannot be transmitted to the touch channel through the touch wire C, so that the touch sub-region U' corresponding to the touch channel is in a state where the touch sensing is impossible.

The display panel 100 can be folded along the boundary line between two adjacent touch sub-regions U'. When the display panel 100 is unfolded, the plurality of switch modules T are all in the on state, and the two adjacent touch sub-regions U' perform the touch sensing. When the display panel 100 is folded, switch modules T corresponding to one of the two adjacent touch sub-regions U' are in the on state, the one of the two adjacent touch sub-regions U' performs the touch sensing, and switch modules T corresponding to the other of the two adjacent touch sub-regions U' are in an off state.

For example, in a case where the display panel 100 can be folded along the dotted line Li as shown in FIG. 7, and the touch region U includes the first touch sub-region U1 and the second touch sub-region U2, when the display panel 100 is in an unfolded state, the switch modules T corresponding to the first touch sub-region U1 and the second touch sub-region U2 are all in the on state (that is, all the switch modules T in the display apparatus 1000 are in the on state). When the display panel 100 is in a folded state and the first touch sub-region U1 (i.e., display and control functions of the first touch sub-region U1) needs to be used, the switch modules T corresponding to the first touch sub-region U1 is in the on state, so that the first touch sub-region U1 performs the touch sensing; the switch modules T corresponding to the second touch sub-region U2 is in the off state, so that the second touch sub-region U2 is in the sleep state, thereby achieving split-screen control of the display panel 100 and even the display apparatus 1000.

Referring to FIG. 7, for multiple touch wires C electrically connected to the plurality of touch channels located in the same touch sub-region U', each of at least a part of the multiple touch wires C is electrically connected to one switch module T.

For example, referring to FIG. 7, among all the touch wires C of the display panel 100, each touch wire C is electrically connected to one switch module T.

For example, among all the touch wires C of the display panel 100, each of a part of the touch wires C is electrically connected to one switch module T. For example, referring to FIG. 14, the second touch wire C2 electrically connected to the second touch channel 2 directly extends to the bonding region V without connecting to the switch module T, and each of the plurality of first touch wires C1 is electrically connected to one switch module T.

For example, as shown in FIG. 7, the plurality of switch modules T is arranged in the first direction X.

The plurality of touch wires C are gathered between the touch region U and the bonding region V. By arranging the plurality of switch modules T in the first direction X in a region located between the touch region U and the bonding region V, it may be ensured that each switch module T is electrically connected to the touch wire C extending to the region; and in addition, the plurality of switch modules T are arranged in a concentrated manner, which may effectively reduce the difficulty of the fabrication process.

In the display panel 100 provided in the above embodiments of the present disclosure, by arranging the switch module T and electrically connecting the switch module T to the touch wire C, the switch module T may control the conduction or disconnection of the touch signal in the touch wire C, thereby achieving the control of the touchable state of the touch sub-region U' where the touch channel electrically connected to the touch wire C is located, i.e., achieving the split-screen control of the display panel 100.

By implementing the split-screen control of the display panel 100 through the switch module T, it is possible to avoid using different touch chips 300 to implement the split-screen control solution. Thus, the foldable display panel 100 may be suitable for a conventional circuit board 200 on which only one touch chip 300 is provided; and in addition, it may avoid increasing the number of touch chips 300 on the circuit board 200. For example, referring to FIG. 7, only one touch chip 300 for transmitting touch signals is provided, thereby reducing the fabrication cost of the display apparatus 1000.

Figure 10:
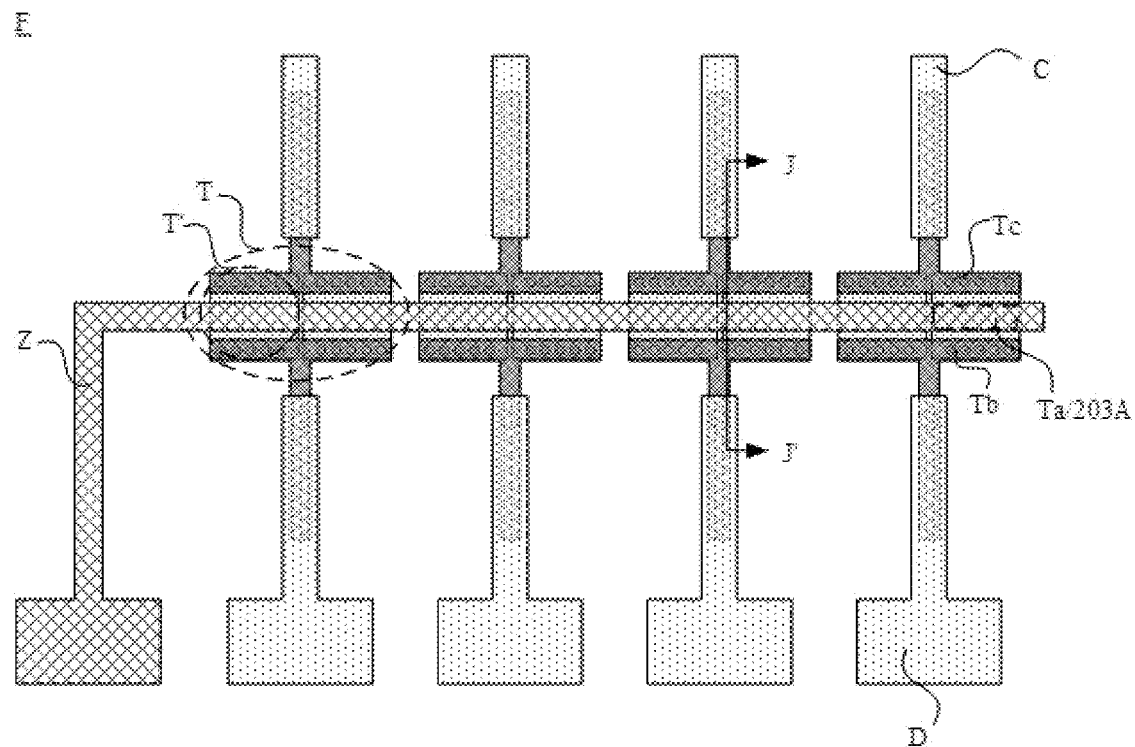
FIG. 10 is an enlarged diagram of a structure corresponding to a region where the dashed box F in FIG. 7 is located.

In some embodiments, as shown in FIG. 10, the switch module T includes at least one switch transistor T'. Each switch transistor T' includes a gate Ta, a source Tb and a drain Tc.

The gate Ta of the switch transistor T' is configured to receive a switch control signal.

The switch control signal is configured to turn on or off the switch transistor T', thereby controlling the switch state of the switch module T.

A first electrode of the switch transistor T' is configured to receive a touch signal, and a second electrode of the switch transistor T' is electrically connected to the touch wire C.

The first electrode is one of the source Tb and the drain Tc of the switch transistor T', and the second electrode is the other of the source Tb and the drain Tc of the switch transistor T'.

For example, the switch transistor T' may be a P-MOS transistor (P-type transistor) or an N-MOS transistor (N-type transistor).

For example, in a case where the switch transistor T' is a P-MOS transistor, the first electrode is the source Tb, and the second electrode is the drain Tc. That is, the source Tb of the switch transistor T' is configured to receive the touch signal, and the drain Tc of the switch transistor T' is electrically connected to the touch wire C.

In this case, the switch transistor T' can be turned off by transmitting a high-level voltage to the gate Ta of the switch transistor T'; and the switch transistor T' can be turned on by transmitting a low-level voltage to the gate Ta of the switch transistor T', thereby transmitting the touch signal at the source Tb to the touch channel through the touch wire C, and achieving the touch sensing of the touch sub-region U' where the touch channel is located.

For example, in a case where the switch transistor T' is an N-MOS transistor, the first electrode is the drain Tc, and the second electrode is the source Tb. That is, the drain Tc of the switch transistor T' is configured to receive the touch signal, and the source Tb of the switch transistor T' is electrically connected to the touch wire C.

In this case, the switch transistor T' can be turned on by transmitting a high-level voltage to the gate Ta of the switch transistor T', thereby transmitting the touch signal at the drain Tc to the touch channel through the touch wire C, and achieving the touch sensing of the touch sub-region U' where the touch channel is located; and the switch transistor T' can be turned off by transmitting a low-level voltage to the gate Ta of the switch transistor T'.

For example, referring to FIG. 10, a switch module T' includes two switch transistors T' that are connected in parallel. For example, the gates Ta of the two switch transistors T' are insulated from each other, and the sources Tb of the two switch transistors T' are electrically connected to each other, and the drains Tc of the two switch transistors T' are electrically connected to each other.

Figure 11:
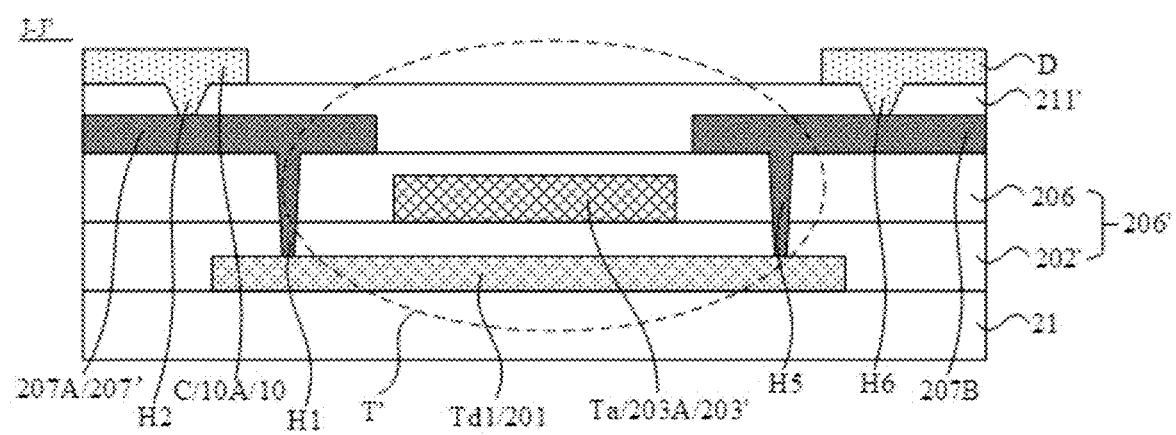
FIG. 11 is a sectional view taken along the section line J-J' in FIG. 10.

In some embodiments, as shown in FIG. 11, the display panel 100 includes a substrate 21, an active layer 201, and a gate conductive layer 203'.

For example, the gate conductive layer 203' may include only one layer, e.g., only a first gate conductive layer 203, or may include two layers, e.g., the first gate conductive layer 203 and a second gate conductive layer 205 (see FIG. 6).

Referring to FIG. 11, the active layer 201 is disposed on the substrate 21, and the active layer 201 includes first active layer patterns Td1 located between the touch region U and the bonding region V (see FIG. 7).

The first active layer pattern Td1 forms a channel, the first electrode, and the second electrode of the switch transistor T'. The channel is located between the first electrode and the second electrode. A portion of the first active layer pattern Td1 overlapping the gate conductive layer 203' may form the channel.

The gate conductive layer 203' is stacked with the active layer 201, and the gate conductive layer 203' includes gate conductive patterns 203A located between the touch region U and the bonding region V, and the gate conductive pattern 203A forms the gate Ta of the switch transistor T'.

For example, in the case where the gate conductive layer 203' includes the first gate conductive layer 203 and the second gate conductive layer 205, the gate conductive patterns 203A are located in the first gate conductive layer 203.

For example, referring to FIG. 11, the display panel 100 further includes a gate insulating layer 202'.

The gate insulating layer 202' may include only one layer, e.g., only a first gate insulating layer 202 (see FIG. 6), or may include two layers, e.g., the first gate insulating layer 202 and a second gate insulating layer 204 (see FIG. 6).

Referring to FIG. 11, the gate insulating layer 202' is disposed between the active layer 201 and the gate conductive layer 203'. For example, the first gate insulating layer 202 is disposed between the active layer 201 and the first gate conductive layer 203, so that the gate conductive pattern 203A and the first active layer pattern Td1 are insulated from each other.

Under the control of the gate conductive pattern 203A, the channel may be formed in the first active layer pattern Td1, so that the first electrode and the second electrode in the first active layer pattern Td1 are connected through the channel, thereby turning on the switch transistor T'.

By arranging the first electrode and the second electrode of the switch transistor T' to be located in the active layer 201, and the gate Ta of the switch transistor T' to be located in the gate conductive layer 203' (i.e., by forming the switch transistor T' through the original film layers for forming the sub-pixel P, the switch transistor T' may be manufactured simultaneously in the processes of manufacturing the sub-pixel P, which reduces the processes of specially manufacturing the switch transistor T' and avoids increasing the difficulty of manufacturing the display panel 100. In addition, there is no need to design a special film layer for the switch transistor T', which avoids increasing the thickness of the display panel 100, and is conducive to achieving the design of light weight and small thickness of the display apparatus 1000.

In some embodiments, as shown in FIG. 11, the display panel 100 further includes a source-drain conductive layer 207', a first insulating layer 206', a touch conductive layer 10, and a second insulating layer 211'.

Referring to FIG. 11, the source-drain conductive layer 207' is disposed on a side of the active layer 201 and the gate conductive layer 203' away from the substrate 21, and the source-drain conductive layer 207' includes first connection patterns 207A located between the touch region U and the binding region V (see FIG. 7).

For example, the source-drain conductive layer 207' may include only one layer. For example, the source-drain conductive layer 207' includes only a first source-drain conductive layer 207. Alternatively, the source-drain conductive layer 207' may include multiple layers. For example, referring to FIG. 12, the source-drain conductive layer 207' includes the first source-drain conductive layer 207 and a second source-drain conductive layer 210.

Referring to FIG. 11, the first insulating layer 206' is disposed between the source-drain conductive layer 207' and the active layer 201, and the first insulating layer 206' is provided with first via holes H1 therein. A first connection pattern 207A is electrically connected to a first active layer pattern Td1 through a first via hole H1.

For example, referring to FIG. 11, in the case where the display panel 100 includes the gate insulating layer 202', the first insulating layer 206' includes the gate insulating layer 202'.

For example, referring to FIG. 11, the display panel 100 includes an interlayer dielectric layer 206.

In the case where the display panel 100 includes the interlayer dielectric layer 206, the first insulating layer 206' includes the interlayer dielectric layer 206.

For example, referring to FIG. 6, the display panel 100 includes the first gate insulating layer 202.

In the case where the display panel 100 includes the first gate insulating layer 202, the first insulating layer 206' further includes the first gate insulating layer 202.

Referring to FIG. 11, the touch conductive layer 10 is disposed on a side of the source-drain conductive layer 207' away from the substrate 21, and the plurality of touch wires C are disposed in the touch conductive layer 10.

The second insulating layer 211' is disposed between the touch conductive layer 10 and the source-drain conductive layer 207', and the second insulating layer 211' is provided with second via holes H2 therein. A touch wire C is electrically connected to a first connection pattern 207A through a second via hole H2.

For example, in a case where the display panel 100 includes a second planarization layer 211 (see FIG. 6), the second insulating layer 211' includes the second planarization layer 211.

For example, the second insulating layer 211' further includes an insulating dielectric film layer such as a pixel defining layer 302 (see FIG. 6) disposed between the touch conductive layer 10 and the source-drain conductive layer 207'.

The touch wire C in the touch conductive layer 10 is connected to the first active layer pattern Td1 through the first connection pattern 207A in the source-drain conductive layer 207', so that the touch wire C is electrically connected to the switch module T. It may avoid a situation where the touch wire C is directly connected to the first active layer pattern Td1 by a via hole, which makes the via hole too deep and causes poor stability of the connection. In addition, the structure for connecting the touch wire C and the switch module T also utilizes the original film layers for forming the sub-pixel P, which further reduces the difficulty of manufacturing the display panel 100, and is conducive to achieving the design of light weight and small thickness of the display apparatus 1000.

Figure 12:
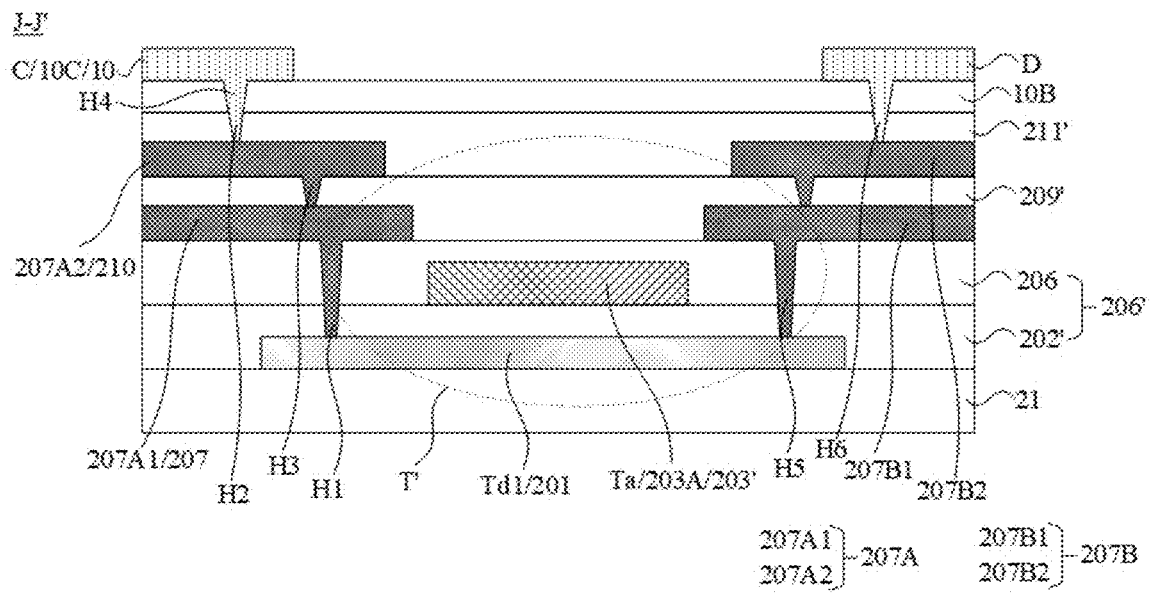
FIG. 12 is another sectional view taken along the section line J-J' in FIG. 10.

In some embodiments, as shown in FIG. 12, the source-drain conductive layer 207' includes the first source-drain conductive layer 207 and the second source-drain conductive layer 210; the first connection pattern 207A includes a first connection sub-pattern 207A1 and a second connection sub-pattern 207A2, the first connection sub-pattern 207A1 is arranged in the first source-drain conductive layer 207, and the second connection sub-pattern 207A2 is arranged in the second source-drain conductive layer 210.

Referring to FIG. 12, the display panel 100 further includes a third insulating layer 209'. The third insulating layer 209' is disposed between the first source-drain conductive layer 207 and the second source-drain conductive layer 210, and the third insulating layer 209' is provided with third via holes H3 therein.

For example, in a case where the display panel 100 further includes a passivation layer 208 (see FIG. 6), the third insulating layer 209' includes the passivation layer 208.

For example, in a case where the display panel 100 further includes a first planarization layer 209 (see FIG. 6), the third insulating layer 209' further includes the first planarization layer 209.

Referring to FIG. 12, the first connection sub-pattern 207A1 is electrically connected to the first active layer pattern Td1 through a first via hole H1, the second connection sub-pattern 207A2 is electrically connected to the first connection sub-pattern 207A1 through a third via hole H3, and the touch wire C is electrically connected to the second connection sub-pattern 207A2 through a second via hole H2.

That is, the touch wire C in the touch conductive layer 10 is connected to the first active layer pattern Td1 through the second connection sub-pattern 207A2 in the second source-drain conductive layer 210 and the first connection sub-pattern 207A1 in the first source-drain conductive layer 207 in sequence, so that the touch wire C is electrically connected to the switch module T. The depth of a single via hole is further reduced to avoid the electrical connection between the touch wire C and the first active layer pattern Td1 through a relatively deep via hole, thereby improving the stability of the connection between the touch wire C and the switch module T. In addition, the electrical connection between the touch wire C and the switch module T also utilizes the original film layers for forming the sub-pixel P, which further reduces the difficulty of manufacturing the display panel 100, and is conducive to achieving the design of light weight and small thickness of the display apparatus 1000.

Figure 13:
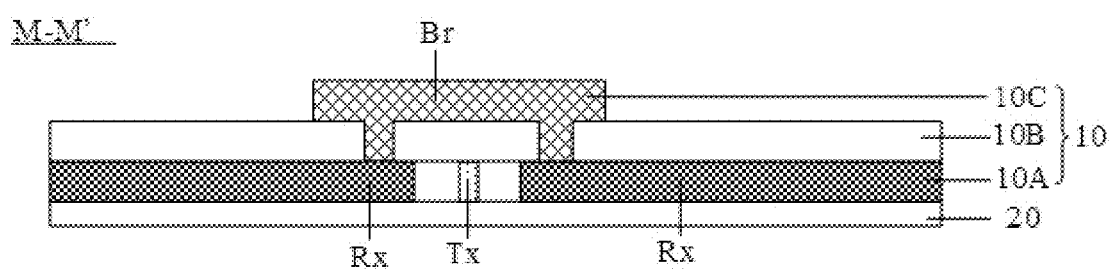
FIG. 13 is a sectional view taken along the section line M-M' shown in FIG. 7.

In some embodiments, as shown in FIG. 13, the touch conductive layer 10 includes a first conductive layer 10A, a fourth insulating layer 10B, and a second conductive layer 10C that are stacked in sequence in a direction away from the substrate 21.

Referring to FIG. 13, the fourth insulating layer 10B is located between the first conductive layer 10A and the second conductive layer 10C.

For example, as shown in FIG. 13, the first touch electrodes Tx and the second touch electrodes Rx are located in the first conductive layer 10A.

For example, the first touch electrodes Tx and the second touch electrodes Rx are located in the second conductive layer 10C.

For example, referring to FIG. 7, in the first direction X, two adjacent first touch electrodes Tx are electrically connected to each other. In the second direction Y, two adjacent second touch electrodes Rx are bridged by a bridge portion Br (referring to FIG. 13). The bridge portion Br and the second touch electrode Rx are located in different film layers. For example, referring to FIG. 13, the first touch electrode Tx and the second touch electrode Rx are located in the first conductive layer 10A, the bridge portion Br is located in the second conductive layer 10C, and the bridge portion Br is bridged with the second touch electrode Rx through a via hole penetrating through the fourth insulating layer 10B.

Referring to FIG. 11, the touch wire C is located in the first conductive layer 10A.

In this case, the touch wire C can be electrically connected to the first connection pattern 207A through the second via hole H2 and finally connected to the first active layer pattern Td1.

Alternatively, referring to FIG. 12, the fourth insulating layer 10B is provided with fourth via holes H4 therein; the touch wire C is located in the second conductive layer 10C, and the touch wire C is electrically connected to the first connection pattern 207A through a fourth via hole H4 and a second via hole H2 in sequence, and finally connected to the first active layer pattern Td1.

The touch wire C is arranged in the original film layer of the touch conductive layer 10, and the touch wire C and the switch module T are connected through the original film layer of the touch conductive layer 10, which further reduces the difficulty of manufacturing the display panel 100, and is conducive to achieving the design of light weight and small thickness of the display apparatus 1000.

In some embodiments, as shown in FIGS. 11 and 12, the display substrate 100 further includes touch pins D.

Referring to FIG. 7, the touch pins D are disposed in the bonding region V, and the touch pin D is electrically connected to the switch module T. The touch pin D is configured to be bonded and connected to the circuit board 200.

For example, the touch pin D is a portion of the touch wire C. For example, the exposed portion of the touch wire C after extending to the bonding region V is the touch pin D. One electrode of the switch module T is electrically connected to the touch pin D, and the other electrode of the switch module T is electrically connected to a portion of the touch wire C extending in the peripheral region. That is, the touch pin D and the touch wire C are connected as a whole through the switch module T, so that the path of the touch signal from the touch pin D to the touch channel may be controlled by controlling the on and off state of the switch module T.

In some embodiments, as shown in FIGS. 11 and 12, the touch pins D are arranged in the touch conductive layer 10.

Referring to FIG. 11, the source-drain conductive layer 207' further includes second connection patterns 207B located on a side of the first connection patterns 207A away from the touch region U (see FIG. 7).

Referring to FIG. 11, the first insulating layer 206' is further provided with fifth via holes H5 therein, and a second connection pattern 207B is electrically connected to a first active layer pattern Td1 through a fifth via hole H5.

Referring to FIG. 11, the second insulating layer 211' is further provided with sixth via holes H6 therein, and the touch pin D is electrically connected to the second connection pattern 207B through a sixth via hole H6.

That is, the touch pin D is also connected to the first active layer pattern Td1 through the second connection pattern 207B in the source-drain conductive layer 207', so that the touch pin D is electrically connected to the switch module T.

It may avoid the direct electrical connection between the touch pin D and the first active layer pattern Td1 through a relatively deep via hole, thereby improving the stability of the connection between the touch pin D and the switch module T. In addition, the electrical connection between the touch pin D and the switch module T also utilizes the original film layers for forming the sub-pixel P, which further reduces the difficulty of manufacturing the display panel 100, and is conducive to achieving the design of light weight and small thickness of the display apparatus 1000.

It should be noted that the first connection pattern 207A and the second connection pattern 207B are electrically connected to an end of the first active layer pattern Td1 for forming the first electrode and an end of the first active layer pattern Td1 for forming the second electrode, respectively. When the gate Ta of the switch module T does not receive the switch control signal, the first electrode and the second electrode of the first active layer pattern Td1 are insulated from each other, which means that the first connection pattern 207A and the second connection pattern 207B are insulated from each other. That is, the touch pin D and the touch wire C are insulated from each other. Thus, the touch signal transmitted to the touch pin D cannot be smoothly transmitted to the touch wire C and even to the touch channel, so that the corresponding touch sub-region U' is in a non-touch sensing state.

When the gate Ta of the switch module T controls the first active layer pattern Td1 to form the channel, the first electrode and the second electrode of the first active layer pattern Td1 are connected through the channel, which means that the first connection pattern 207A and the second connection pattern 207B are connected. That is, the touch pin D and the touch wire C are connected to each other. Thus, the touch signal transmitted to the touch pin D is smoothly transmitted to the touch wire C and even to the touch channel, so that the corresponding touch sub-region U' is in a touch sensing state, thereby achieving the split-screen control of the display panel 100.

In some embodiments, as shown in FIG. 12, in the case where the source-drain conductive layer 207' includes the first source-drain conductive layer 207 and the second source-drain conductive layer 210, the second connection pattern 207B includes a third connection sub-pattern 207B1 and a fourth connection sub-pattern 207B2, the third connection sub-pattern 207B1 is arranged in the first source-drain conductive layer 207, and the fourth connection sub-pattern 207B2 is arranged in the second source-drain conductive layer 210.

Referring to FIG. 12, similar to the connection method of the touch wire C, the touch pin D can also be connected to the first active layer pattern Td1 through the fourth connection sub-pattern 207B2 in the second source-drain conductive layer 210 and the third connection sub-pattern 207B1 in the first source-drain conductive layer 207 in sequence, so that the touch pin D is electrically connected to the switch module T. The depth of a single via hole is further reduced to avoid the electrical connection between the touch pin D and the first active layer pattern Td1 through a relatively deep via hole, thereby improving the stability of the connection between the touch pin D and the switch module T. In addition, the electrical connection between the touch pin D and the switch module T also utilizes the original film layers for forming the sub-pixel P, which further reduces the difficulty of manufacturing the display panel 100, and is conducive to achieving the design of light weight and small thickness of the display apparatus 1000.

In some embodiments, as shown in FIG. 13, in the case where the touch conductive layer 10 includes the first conductive layer 10A, the fourth insulating layer 10B, and the second conductive layer 10C that are stacked in sequence in the direction away from the substrate 21, similar to the connection manner of the touch wire C, the touch pin D can also be located in the first conductive layer 10A or in the second conductive layer 10C.

Referring to FIGS. 11 and 12, the touch pin D may also be connected to the switch module T through the original film layer of the touch conductive layer 10, which further reduces the difficulty of manufacturing the display panel 100, and is conducive to achieving the design of light weight and small thickness of the display apparatus 1000.

In some embodiments, as shown in FIG. 7, the display panel 100 further includes a control signal line Z.

Referring to FIG. 10, the control signal line Z is electrically connected to the gate Ta of a switch transistor T'. The control signal line Z is configured to transmit the switch control signal to the switch transistor T', and the switch control signal is used to control the switch transistor T' to be turned on or off.

For example, the switch control signal may be a high-level voltage signal or a low-level voltage signal.

For example, as shown in FIG. 7, one end of the control signal line Z is electrically connected to the gate Ta of at least one switch transistor T', and the other end of the control signal line Z extends to the bonding region V to be bonded to the circuit board 200, and is finally electrically connected to the timing controller 400 on the circuit board 200. The switch control signal is transmitted to the control signal line Z through the timing controller 400, so as to achieve the switch control of the switch transistor T'.

In some embodiments, in the case where the display panel 100 further includes the gate conductive layer 203', and the gate conductive layer 203' includes the gate conductive pattern 203A, the control signal line Z is arranged in the gate conductive layer 203'; and referring to FIG. 10, the control signal line Z and the gate conductive pattern 203A form a one-piece structure.

For example, referring to FIGS. 7 and 10, a single control signal line Z and gate conductive patterns 203A of multiple switch transistors T' form a one-piece structure.

In some embodiments, as shown in FIG. 7, the display panel 100 includes a plurality of control signal lines Z, and a single touch sub-region U' corresponds to at least one control signal line Z. For example, referring to FIG. 7, the control signal lines Z includes a first sub-line Z1, a second sub-line Z2 and a third sub-line Z3; the touch region U includes the first touch sub-region U1 and the second touch sub-region U2, the first touch sub-region U1 corresponds to the first sub-line Z1 and the second sub-line Z2, and the second touch sub-region U2 corresponds to the third sub-line Z3.

For a control signal line Z and a touch sub-region U' corresponding to the control signal line Z, switch transistors T' connected to the plurality of touch channels located in the touch sub-region U' are all electrically connected to the control signal line Z, and the switch transistors T' can be controlled to be turned on or off through the control signal line Z, thereby achieving the control of the touch sensing of the touch channels in the touch sub-region U' corresponding to the control signal line Z.

For example, as shown in FIG. 7, in the case where the touch region U includes the first touch sub-region U1 and the second touch sub-region U2, the second touch sub-region U2 corresponds to one control signal line Z, and switch transistors T' connected to multiple touch wires that are electrically connected to the plurality of touch channels in the second touch sub-region U2 are all electrically connected to the one control signal line Z. That is, the control signal line Z simultaneously controls switch transistors T' corresponding to the second touch sub-region U2, thereby controlling the transmission of touch signals in the touch channels in the second touch sub-region U2, i.e., controlling the touch sensing state or sleep state of the second touch sub-region U2.

In some embodiments, as shown in FIG. 7, the display panel 100 includes a plurality of switch module groups W, each switch module group W includes at least one switch module T, and the switch module(s) T in the same switch module group W transmit the same switch control signal.

For example, referring to FIG. 7, the display panel 100 includes three switch module groups W that are arranged in sequence in the first direction X. The switch module(s) T in each switch module group W are electrically connected to the same control signal line Z, thereby transmitting the same switch control signal.

In the plurality of touch sub-regions U', each touch sub-region U' corresponds to switch module(s) T in at least one switch module group W, and different touch sub-regions U' correspond to different switch module groups W.

For example, referring to FIG. 7, the display panel 100 includes three switch module groups W arranged in sequence in the first direction X, the control signal line Z includes the first sub-line Z1, the second sub-line Z2 and the third sub-line Z3, and the touch region U includes the first touch sub-region U1 and the second touch sub-region U2; the first touch sub-region U1 corresponds to two switch module groups W arranged at both sides of the display panel 100, the second touch sub-region U2 corresponds to the switch module group W located between the two switch module groups W, and the first touch sub-region U1 and the second touch sub-region U2 correspond to different switch module groups W, thereby achieving the split-screen control of the first touch sub-region U1 and the second touch sub-region U2.

For example, switch modules T in different switch module groups W are electrically connected to different control signal lines Z, thereby achieving the separate control of the switch modules T in different switch module groups W. For example, referring to FIG. 7, the two switch module groups W that are respectively arranged at both sides of the display panel 100 and are electrically connected to the first touch sub-region U1 are electrically connected to the first sub-line Z1 and the second sub-line Z2. In a case where the first sub-line Z1 and the second sub-line Z2 transmit the same switch control signal, the touch sensing state or sleep state of the first touch sub-region U1 may be controlled. The switch modules T in the switch module group W that is located between the two switch module groups W and is electrically connected to the second touch sub-region U2 are all electrically connected to the third sub-line Z3, so that the touch sensing state or sleep state of the second touch sub-region U2 is controlled by the switch control signal transmitted by the third sub-line Z3.

In some embodiments, as shown in FIG. 7, in each touch sub-region U', the plurality of touch channels include a plurality of first touch channels 1 and a plurality of second touch channels 2, and the plurality of first touch channels 1 and the plurality of second touch channels 2 are crossed and insulated from each other. The plurality of touch wires C include a plurality of first touch wires C1 and a plurality of second touch wires C2; in the plurality of first touch wires C1 and the plurality of second touch wires C2, multiple first touch wires C1 are electrically connected to the plurality of first touch channels 1, and multiple second touch wires C2 are electrically connected to the plurality of second touch channels 2.

For example, referring to FIG. 7, for each touch sub-region U', each of the multiple first touch wires C1 is electrically connected to one switch module T, and the switch modules T connected to the multiple first touch wires C1 are configured to receive the same switch control signal.

For example, referring to FIG. 7, in the case where the touch region U includes the first touch sub-region U1 and the second touch sub-region U2, the multiple first touch wires C1 corresponding to the second touch sub-region U2 are electrically connected to respective switch modules T, and the switch modules T electrically connected to the multiple first touch wires C1 are simultaneously electrically connected to one control signal line Z, thereby receiving the same switch control signal. Thus, the touch sensing functions of the plurality of first touch channels 1 in the second touch sub-region U2 are simultaneously controlled. That is, the touchable state of the second touch sub-region U2 is controlled.

For example, referring to FIG. 7, in the case where the touch region U includes the first touch sub-region U1 and the second touch sub-region U2, the multiple first touch wires C1 corresponding to the first touch sub-region U1 are electrically connected to respective switch modules T, and among the switch modules T electrically connected to the multiple first touch wires C1, a part of the switch modules T are electrically connected to one control signal line Z, and another part of the switch modules T are electrically connected to another control signal line Z. The two control signal lines Z transmit the same switch control signal, so that the switch modules T corresponding to the first touch sub-region U1 receive the same switch control signal. Thus, the touch sensing functions of the plurality of first touch channels 1 in the first touch sub-region U1 are simultaneously controlled. That is, the touchable state of the first touch sub-region U1 is controlled.

Referring to FIG. 7, for each touch sub-region U', each of the multiple second touch wires C2 is electrically connected to one switch module T, and the switch modules T connected to the multiple second touch wires C2 are configured to receive the same switch control signal.

For example, referring to FIG. 7, in the case where the touch region U includes the first touch sub-region U1 and the second touch sub-region U2, the multiple second touch wires C2 corresponding to the second touch sub-region U2 are electrically connected to respective switch modules T, and the switch modules T electrically connected to the multiple second touch wires C2 are simultaneously electrically connected to one control signal line Z, thereby receiving the same switch control signal.

For example, referring to FIG. 7, for each touch sub-region U', the switch module T electrically connected to each of the multiple first touch wires C1 and the switch module T electrically connected to each of the multiple second touch wires C2 both receive the same switch control signal.

For example, referring to FIG. 7, in the case where the touch region U includes the first touch sub-region U1 and the second touch sub-region U2, the switch modules T electrically connected to the multiple first touch wires C1 that are electrically connected to the plurality of first touch channels 1 in the second touch sub-region U2 and the switch modules T electrically connected to the multiple second touch wires C2 that are electrically connected to the plurality of second touch channels 2 in the second touch sub-region U2 are all electrically connected to the same control signal line Z, thereby receiving the same switch control signal. Thus, the control signal line Z may be used to control the touchable states of all touch channels in the second touch sub-region U2.

Figure 14:
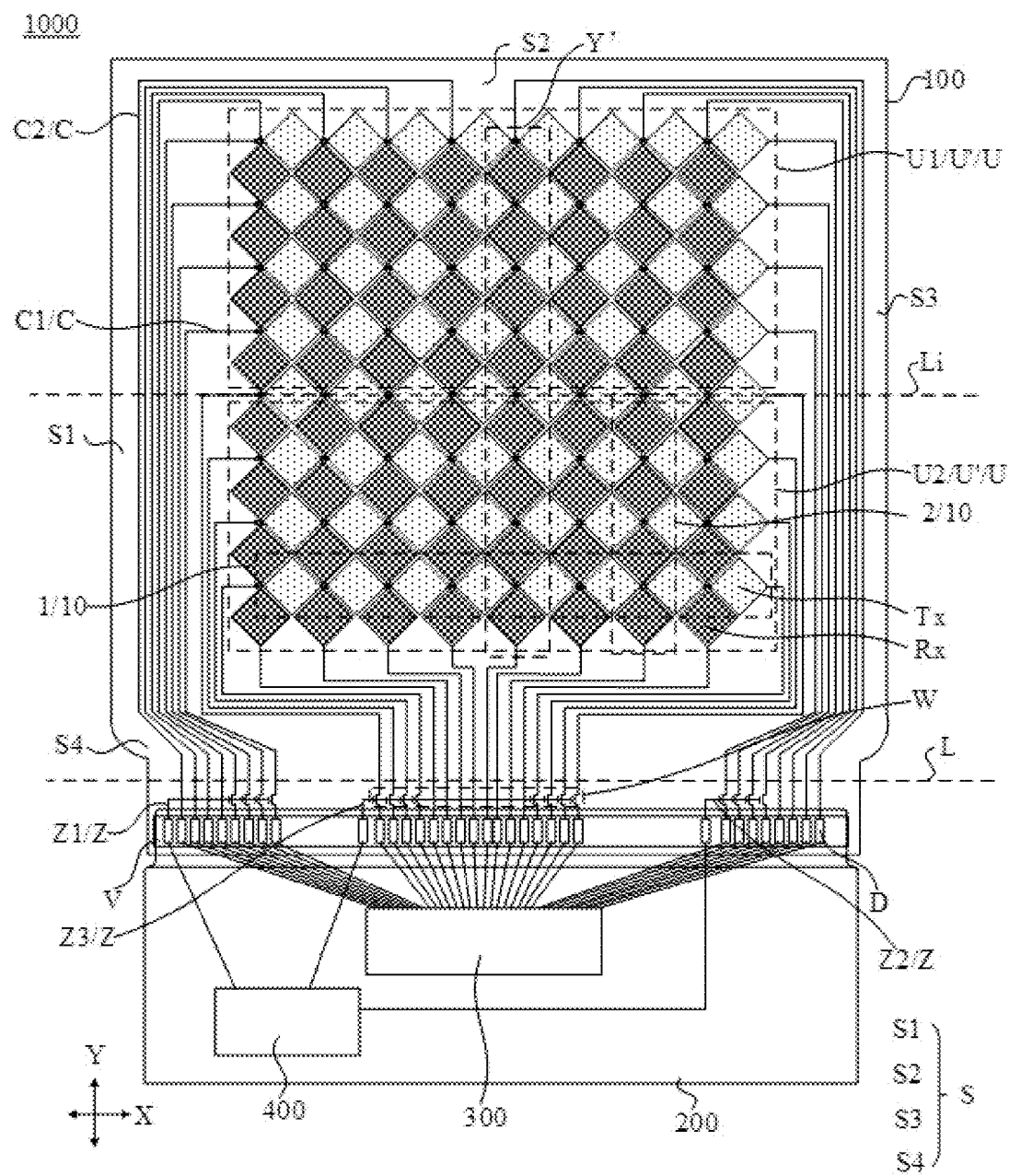
FIG. 14 is a top view of yet another display apparatus, in accordance with some embodiments.

For example, referring to FIG. 14, for each touch sub-region U', each of the multiple first touch wires C1 is electrically connected to one switch module T, and the switch modules T connected to the multiple first touch wires C1 are configured to receive the same switch control signal. Moreover, for each touch sub-region U', each of the multiple second touch wires C2 is not connected to the switch module T, and directly extends to the bonding region V.

For example, referring to FIG. 14, in the case where the touch region U includes the first touch sub-region U1 and the second touch sub-region U2, the switch modules T electrically connected to the multiple first touch wires C1 that are electrically connected to the plurality of first touch channels 1 in the second touch sub-region U2 are electrically connected to the same control signal line Z, thereby receiving the same switch control signal; and the multiple second touch wires C2 electrically connected to the plurality of second touch channels 2 in the second touch sub-region U2 directly extend to the bonding region V, and are finally electrically connected to the touch chip 300 on the circuit board 200 through the bonding region V.

That is, the plurality of second touch channels 2 in the second touch sub-region U2 all directly receive touch signals, and the touch sensing state of the second touch sub-region U2 is controlled only by controlling the on state of the touch signals of the plurality of first touch channels 1 in the second touch sub-region U2.

For example, the plurality of second touch channels 2 in the second touch sub-region U2 are all in the on state, and the switch modules T corresponding to the plurality of first touch channels 1 in the second touch sub-region U2 are controlled to be turned off, so that the plurality of first touch channels 1 do not receive the touch signal (that is, there is no current transmission in the plurality of first touch channels 1). Thus, even if the plurality of second touch channels 2 are all in the on state, when the first touch channel 1 adjacent to the second touch channel 2 is in the off state, no mutual capacitance may be generated between the first touch channel 1 and the second touch channel 2. Therefore, after touching, the mutual capacitance value at the touch position cannot be detected. That is, the touch sensing function of the second touch sub-region U2 cannot be implemented.

Similarly, only when the switch modules T corresponding to the plurality of first touch channels 1 in the second touch sub-region U2 are turned on, the plurality of first touch channels 1 in the second touch sub-region U2 are also in the on state, so that the first touch channel 1 and the second touch channel 2 generate mutual capacitance, and the touch sensing function of the second touch sub-region U2 can be implemented.

That is, the split-screen control of the display panel 100 may be achieved by only providing the switch modules T corresponding to the multiple first touch wires C1. Thus, the number of switch modules T is reduced to a certain extent, and the manufacturing cost of the display apparatus 1000 is further reduced.

In some embodiments, as shown in FIGS. 7 and 14, the first touch channel 1 extends in a first direction X, the second touch channel 2 extends in a second direction Y, and the first direction X and the second direction Y intersect. The plurality of touch sub-regions U' include the first touch sub-region U1 and the second touch sub-region U2, and the first touch sub-region U1 and the second touch sub-region U2 are arranged in parallel along the second direction Y.

Referring to FIGS. 7 and 14, in the case where the display panel 100 includes the plurality of switch module groups W, first touch wires C1 connected to the first touch channels 1 in the first touch sub-region U1 and first touch wires C1 connected to the first touch channels 1 in the second touch sub-region U2 are electrically connected to respective switch modules T in different switch module groups W.

For example, referring to FIG. 7, the first touch wires C1 connected to the first touch channels 1 in the first touch sub-region U1 are electrically connected to respective switch modules T in two switch module groups W arranged at both sides of the display panel 100, and the first touch wires C1 connected to the first touch channels 1 in the second touch sub-region U2 are electrically connected to respective switch modules T in a switch module group W located between the two switch module groups W. Thus, by transmitting a switch control signal to the two switch module groups W and transmitting another switch control signal to the switch module group W located between the two switch module groups W, different touch sensing controls of the first touch channels 1 in the first touch sub-region U1 and the first touch channels 1 in the second touch sub-region U2 are achieved.

In some embodiments, referring to FIGS. 7 and 14, two second touch channels 2 arranged in parallel along the second direction Y form a touch queue Y', and the two second touch channels 2 are respectively arranged in the first touch sub-region U1 and the second touch sub-region U2.

Figure 16:
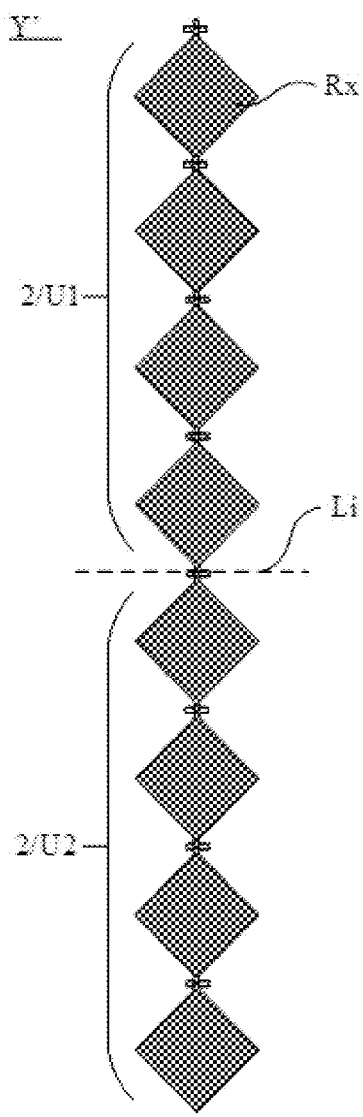
FIG. 16 is an enlarged diagram of a structure of another touch queue, in accordance with some embodiments.

Referring to FIGS. 14 and 16, the two second touch channels 2 belonging to the same touch queue Y' are electrically connected. Referring to FIG. 14, the second touch wire C2 connected to the second touch channel 2 in the first touch sub-region U1 and the second touch wire C2 connected to the second touch channel 2 in the second touch sub-region U2 both directly receive touch signals.

For example, in the case where two second touch channels 2 belonging to the same touch queue Y' are electrically connected, only the second touch channel 2 in the first touch sub-region U1 can be set to connect to the second touch wire C2, or only the second touch channel 2 in the second touch sub-region U2 can be set to connect to the second touch wire C2, which can reduce the number of second touch wires C2 and save wiring space.

By setting the two second touch channels 2 belonging to the same touch queue Y' to be electrically connected, and setting the second touch wires C2 to directly receive touch signals (that is, no switch modules T are provided for the second touch wires C2), only the switch modules T are set corresponding to the first touch wires C1, and the split-screen control of the display panel 100 may be achieved. Thus, the number of switch modules T is reduced to a certain extent, and the manufacturing cost of the display apparatus 1000 is further reduced.

Figure 15:
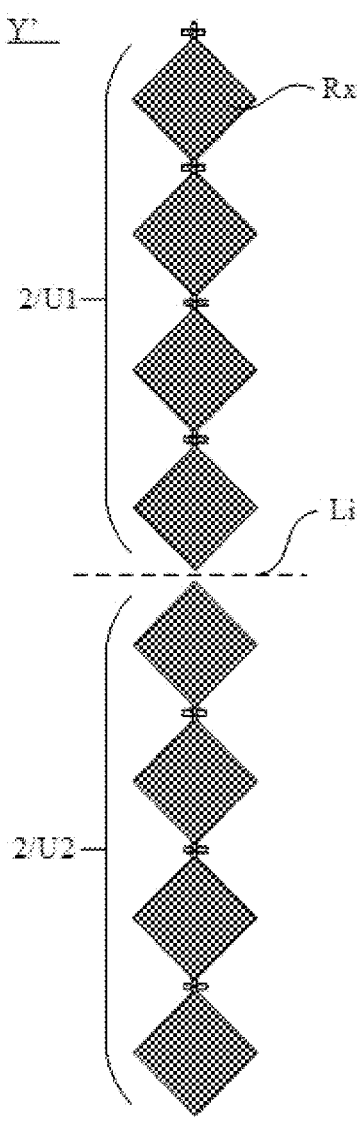
FIG. 15 is an enlarged diagram of a structure of a touch queue, in accordance with some embodiments.

Alternatively, referring to FIGS. 7 and 15, the two second touch channels 2 belonging to the same touch queue Y' are separately from each other. Referring to FIG. 7, the second touch wire C2 connected to the second touch channel 2 in the first touch sub-region U1 and the second touch wire C2 connected to the second touch channel 2 in the second touch sub-region U2 are electrically connected to respective switch modules T in different switch module groups W.

For example, referring to FIG. 7, the second touch wires C2 connected to the second touch channels 2 in the first touch sub-region U1 are electrically connected to respective switch modules T in two switch module groups W arranged at both sides of the display panel 100, and the second touch wires C2 connected to the second touch channels 2 in the second touch sub-region U2 are electrically connected to respective switch modules T in a switch module group W located between the two switch module groups W. Thus, by transmitting a switch control signal to the two switch module groups W and transmitting another switch control signal to the switch module group W located between the two switch module groups W, different touch sensing controls of the second touch channels 2 in the first touch sub-region U1 and the second touch channels 2 in the second touch sub-region U2 are achieved.

That is, in this embodiment, the first touch wires C1 and the second touch wires C2 correspond to respective switch modules T, so that the on states of the first touch channels 1 and the second touch channels 2 in the touch sub-region U' may be controlled simultaneously, thereby achieving split-screen control of the display panel 100. Therefore, when the touch sub-region U' does not need to perform touch sensing, the first touch channels 1 and the second touch channels 2 in the touch sub-region U' are in the sleep state, which may save power consumption of the display apparatus 1000.

For example, in the case where the two second touch channels 2 belonging to the same touch queue Y' are separately from each other, the second touch wire C2 connected to the second touch channel 2 in the first touch sub-region U1 and the second touch wire C2 connected to the second touch channel 2 in the second touch sub-region U2 are all directly extended to the bonding region V, and the switch modules T are not provided.

It should be noted that, the aforementioned embodiments of the present disclosure only illustratively describe the distribution of touch channels in a case where the display panel 100 or even the display apparatus 1000 can be folded along the dotted line Li (see FIG. 3), and do not limit the distribution of touch channels in a case where the display panel 100 or the display apparatus 1000 is folded in other folding manners.

For example, in a case where the display panel 100 can be folded along a center line of the display panel 100 perpendicular to the dotted line Li (see FIG. 4), the plurality of touch sub-regions U' include a first touch sub-region U1 and a second touch sub-region U2, and the first touch sub-region U1 and the second touch sub-region U2 are arranged in parallel along the first direction X.

In this case, two first touch channels 1 arranged in parallel along the first direction X form a touch group, and the two first touch channels 1 are arranged in the first touch sub-region U1 and the second touch sub-region U2, respectively.

In the case where the display panel 100 is folded along the center line of the display panel 100 perpendicular to the dotted line Li, second touch wires C2 connected to second touch channels 2 in the first touch sub-region U1 and second touch wires C2 connected to second touch channels 2 in the second touch sub-region U2 are electrically connected to respective switch modules T in different switch module groups W, and two first touch channels 1 belonging to the same touch group are electrically connected or separately from each other, which is the same as the principle of the display panel 100 being folded along the dotted line Li as described above.

In the case where the two first touch channels 1 belonging to the same touch group are electrically connected, the first touch wire C1 connected to the first touch channel 1 in the first touch sub-region U1 and the first touch wire C1 connected to the first touch channel 1 in the second touch sub-region U2 both directly receive touch signals.

By setting the two first touch channels 1 belonging to the same touch group to be electrically connected, and setting the first touch wires C1 to directly receive touch signals (that is, no switch modules T are provided for the first touch wires C1), only the switch modules T are set corresponding to the second touch wires C2, and the split-screen control of the display panel 100 may be achieved. Thus, the number of switch modules T is reduced to a certain extent, and the manufacturing cost of the display apparatus 1000 is further reduced.

In the case where the two first touch channels 1 belonging to the same touch group are separately from each other, the first touch wire C1 connected to the first touch channel 1 in the first touch sub-region U1 and the first touch wire C1 connected to the first touch channel 1 in the second touch sub-region U2 are electrically connected to respective switch modules T in different switch module groups W.

That is, the first touch wires C1 and the second touch wires C2 correspond to respective switch modules T, so that the on states of the first touch channels 1 and the second touch channels 2 in the touch sub-region U' may be controlled simultaneously, thereby achieving split-screen control of the display panel 100. Therefore, when the touch sub-region U' does not need to perform touch sensing, the first touch channels 1 and the second touch channels 2 in the touch sub-region U' are in the sleep state, which may save power consumption of the display apparatus 1000.

In some embodiments, as shown in FIGS. 7 and 14, the peripheral region S includes a first peripheral region S1, a second peripheral region S2, a third peripheral region S3, and a fourth peripheral region S4 that are connected in sequence.

The first peripheral region S1 and the third peripheral region S3 are arranged opposite to each other, the second peripheral region S2 and the fourth peripheral region S4 are arranged opposite to each other, and the first peripheral region S1 extends in the second direction Y. The bonding region V is disposed in the fourth peripheral region S4.

The first touch wires C1 electrically connected to the plurality of first touch channels 1 in the first touch sub-region U1 extend to the bonding region V through the first peripheral region S1.

Alternatively, the first touch wires C1 electrically connected to the plurality of first touch channels 1 in the first touch sub-region U1 extend to the bonding region V through the third peripheral region S3.

Alternatively, referring to FIGS. 7 and 14, for the plurality of first touch channels 1 in the first touch sub-region U1, each first touch channel 1 is electrically connected to two first touch wires C1; the first touch wire C1 electrically connected to an end of the first touch channel 1 close to the first peripheral region S1 extends to the bonding region V through the first peripheral region S1, and the first touch wire C1 electrically connected to an end of the first touch channel 1 close to the third peripheral region S3 extends to the bonding region V through the third peripheral region S3.

Referring to FIGS. 7 and 14, among the plurality of second touch channels 2 in the first touch sub-region U1, second touch wires C2 electrically connected to second touch channels 2 close to the first peripheral region S1 extend to the bonding region V through the first peripheral region S1, and second touch wires C2 electrically connected to second touch channels 2 close to the third peripheral region S3 extend to the bonding region V through the third peripheral region S3.

The first touch wires C1 electrically connected to the plurality of first touch channels 1 in the second touch sub-region U2 extend to the bonding region V through the first peripheral region S1.

Alternatively, the first touch wires C1 electrically connected to the plurality of first touch channels 1 in the second touch sub-region U2 extend to the bonding region V through the third peripheral region S3.

Alternatively, referring to FIGS. 7 and 14, for the plurality of first touch channels 1 in the second touch sub-region U2, each first touch channel 1 is electrically connected to two first touch wires C1; the first touch wire C1 electrically connected to an end of the first touch channel 1 close to the first peripheral region S1 extends to the bonding region V through the first peripheral region S1, and the first touch wire C1 electrically connected to an end of the first touch channel 1 close to the third peripheral region S3 extends to the bonding region V through the third peripheral region S3.

Referring to FIGS. 7 and 14, the second touch wires C2 electrically connected to the plurality of second touch channels 2 in the second touch sub-region U2 directly extend to the bonding region V.

It should be noted that, the "directly extend" here means not passing through the first peripheral region S1, the second peripheral region S2 and the third peripheral region S3, and does not mean that the switch module T is not connected; and the "directly extend" here does not limit whether the second touch channel 2 is connected to the switch module T.

Through the above wiring design of the touch wires C, it may be possible to avoid complicated wiring design caused by the intersection of different touch wires C, and the touch wires C may be evenly distributed and extended on both sides of the touch region U, thereby maximizing the utilization of the wiring space in the peripheral region S.

In some embodiments, as shown in FIGS. 7 and 14, in a case where the display panel 100 further includes control signal lines Z, the control signal lines Z include a first sub-line Z1, a second sub-line Z2, and a third sub-line Z3.

Referring to FIG. 7, in a direction from the first peripheral region S1 to the third peripheral region S3, the first sub-line Z1, the third sub-line Z3, and the second sub-line Z2 are arranged in sequence, that is, the third sub-line Z3 is arranged between the first sub-line Z1 and the second sub-line Z2. The first sub-line Z1 and the second sub-line Z2 transmit same switch control signals.

Referring to FIG. 7, switch modules T corresponding to first touch wires C1 extending through the first peripheral region S1 in first touch wires C1 electrically connected to the plurality of first touch channels 1 in the first touch sub-region U1, as well as switch modules T corresponding to second touch wires C2 electrically connected to second touch channels 2 close to the first peripheral region S1 in the plurality of second touch channels 2 in the first touch sub-region U1, are all electrically connected to the first sub-line Z1.

Referring to FIG. 7, switch modules T corresponding to first touch wires C1 extending through the third peripheral region S3 in the first touch wires C1 electrically connected to the plurality of first touch channels 1 in the first touch sub-region U1, as well as switch modules T corresponding to second touch wires C2 electrically connected to second touch channels 2 close to the third peripheral region S3 in the plurality of second touch channels 2 in the first touch sub-region U1, are all electrically connected to the second sub-line Z2.

That is, among a plurality of switch modules T corresponding to the plurality of touch channels in the first touch sub-region U1, switch modules T close to the first peripheral region S1 are electrically connected to the first sub-line Z1, and switch modules T close to the third peripheral region S3 are electrically connected to the second sub-line Z2. The on states of the plurality of touch channels (including the plurality of first touch channels 1 and the plurality of second touch channels 2) in the first touch sub-region U1 may be controlled only by the first sub-line Z1 and the second sub-line Z2.

Referring to FIG. 7, switch modules T corresponding to first touch wires C1 electrically connected to the plurality of first touch channels 1 in the second touch sub-region U2 and switch modules T corresponding to second touch wires C2 electrically connected to the plurality of second touch channels 2 in the second touch sub-region U2 are all electrically connected to the third sub-line Z3.

That is, the on states of the plurality of touch channels (including the plurality of first touch channels 1 and the plurality of second touch channels 2) in the second touch sub-region U2 may be controlled only through the third sub-line Z3.

In some embodiments, as shown in FIG. 14, in the case where no switch modules T are provided for all the second touch wires C2 of the display panel 100 and all second touch wires C2 directly extend to the bonding region V, among the first touch wires C1 electrically connected to the plurality of first touch channels 1 in the first touch sub-region U1, switch modules T corresponding to first touch wires C1 extending through the first peripheral region S1 are all electrically connected to the first sub-line Z1, and switch modules T corresponding to first touch wires C1 extending through the third peripheral region S3 are all electrically connected to the second sub-line Z2; and switch modules T corresponding to the first touch wires C1 electrically connected to the plurality of first touch channels 1 in the second touch sub-region U2 are all electrically connected to the third sub-line Z3.

In some embodiments, the first sub-line Z1 and the second sub-line Z2 transmit same switch control signals simultaneously. When the display panel 100 is folded, the switch control signal transmitted by the third sub-line Z3 is different from the switch control signals transmitted by the first sub-line Z1 and the second sub-line Z2.

For example, when the display panel 100 is unfolded, the first sub-line Z1, the second sub-line Z2 and the third sub-line Z3 all transmit low-level voltages (that is, all switch modules T corresponding to all touch sub-regions U' are turned on), so that the entire screen of the display panel 100 may perform touch sensing.

In a case where the display panel 100 is folded and the first touch sub-region U1 needs to be used, the first sub-line Z1 and the second sub-line Z2 both transmit low-level voltages, and the third sub-line Z3 transmits a high-level voltage. That is, the switch modules T corresponding to the first touch sub-region U1 are turned on, and the switch modules T corresponding to the second touch sub-region U2 are turned off. Therefore, the first touch sub-region U1 of the display panel 100 may perform touch sensing, and the second touch sub-region U2 of the display panel 100 is in a sleep and non-touch sensing state, thereby achieving the split-screen control.

In a case where the display panel 100 is folded and the second touch sub-region U2 needs to be used, the first sub-line Z1 and the second sub-line Z2 both transmit high-level voltages, and the third sub-line Z3 transmits a low-level voltage. That is, the switch modules T corresponding to the first touch sub-region U1 are turned off, and the switch modules T corresponding to the second touch sub-region U2 are turned on. Therefore, the second touch sub-region U2 of the display panel 100 may perform touch sensing, and the first touch sub-region U1 of the display panel 100 is in a sleep and non-touch sensing state, thereby achieving the split-screen control.

Another aspect of the embodiments of the present disclosure provides a control method for a display apparatus 1000, and the control method is used to control the display apparatus 1000 as described in any one of the embodiments.

Referring to FIGS. 7 and 14, the display apparatus 1000 includes a plurality of touch sub-region U', and the display apparatus 1000 is capable of being folded along a boundary line of two adjacent touch sub-regions U'.

For example, referring to FIGS. 7 and 14, the display apparatus 1000 includes the first touch sub-region U1 and the second touch sub-region U2, and the display apparatus 1000 is capable of being folded along a boundary line between the first touch sub-region U1 and the second touch sub-region U2, for example, folded along the dotted line Li.

Figure 17:
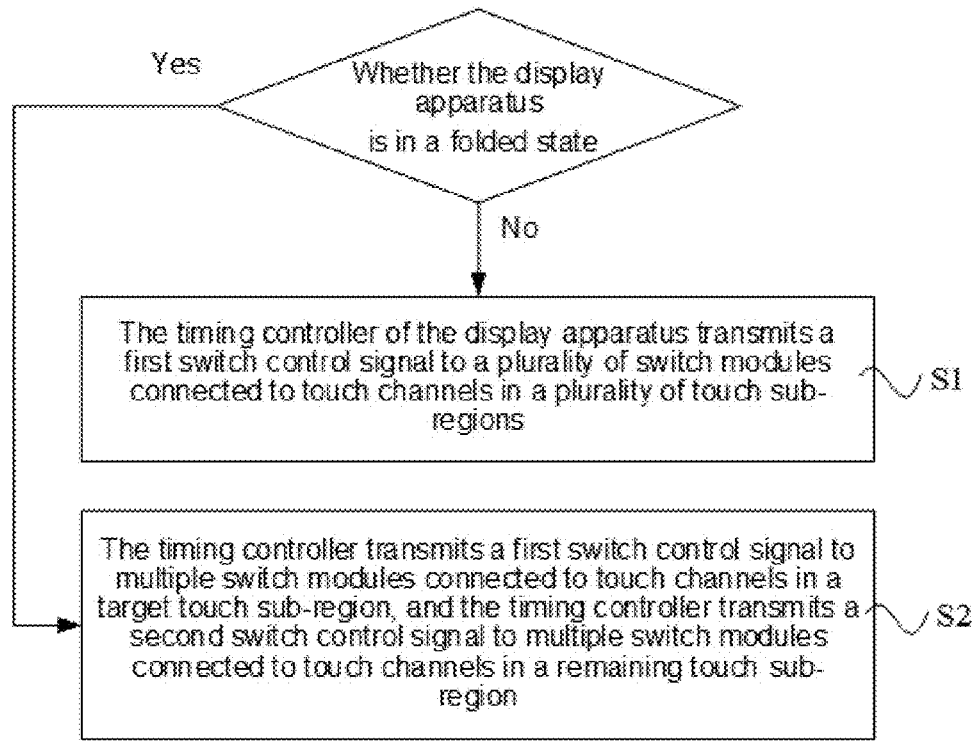
FIG. 17 is a flowchart of a control method for a display apparatus, in accordance with some embodiments.

As shown in FIG. 17, the control method includes the following steps.

In S1, when the display apparatus 1000 is in an unfolded state, the timing controller 400 of the display apparatus 1000 transmits a first switch control signal to a plurality of switch modules T connected to touch channels in a plurality of touch sub-regions U', so that the plurality of switch modules T are turned on, and the plurality of touch sub-regions U' perform touch sensing.

In S2, when the display apparatus 1000 is in a folded state, the timing controller 400 transmits a first switch control signal to multiple switch modules T connected to touch channels in a target touch sub-region, so that the multiple switch modules T corresponding to the target touch sub-region are turned on, and the target touch sub-region performs the touch sensing. The timing controller 400 transmits a second switch control signal to multiple switch modules T connected to touch channels in remaining touch sub-region(s), so that the multiple switch modules T corresponding to the remaining touch sub-region(s) are turned off.

The target touch sub-region is at least one touch sub-region U' among the plurality of touch sub-regions U', and the target touch sub-region is a region of the display apparatus 1000 that needs to perform the touch sensing; and the remaining touch sub-region(s) are touch sub-region(s) U' among the plurality of touch sub-regions U' other than the target sub-region. That is, the target touch sub-region is a region of the display apparatus 1000 that needs to be used to implement a function such as display or control, and the remaining touch sub-region(s) are region(s) of the display apparatus 1000 that do not need to be used and are in a sleep state.

For example, in the case where the display apparatus 1000 includes the first touch sub-region U1 and the second touch sub-region U2, when the display apparatus 1000 is in an unfolded state, both the first touch sub-region U1 and the second touch sub-region U2 need to be used, i.e., need to perform the touch sensing. In this case, the first touch sub-region U1 and the second touch sub-region U2 are both target touch sub-regions.

For example, in the case where the display apparatus 1000 includes the first touch sub-region U1 and the second touch sub-region U2 and the display apparatus 1000 is in a folded state, when the first touch sub-region U1 needs to perform the touch sensing and the second touch sub-region U2 does not need to be used and is in the sleep state, the first touch sub-region U1 is the target touch sub-region, and the second touch sub-region U2 is the remaining touch sub-region; or when the second touch sub-region U2 needs to perform the touch sensing and the first touch sub-region U1 does not need to be used and is in the sleep state, the second touch sub-region U2 is the target touch sub-region, and the first touch sub-region U1 is the remaining touch sub-region.

For example, in a case where the switch transistor T' in the switch module T is a P-MOS transistor, the first switch control signal is a low-level voltage signal, and the second switch control signal is a high-level voltage signal.

Figure 18:
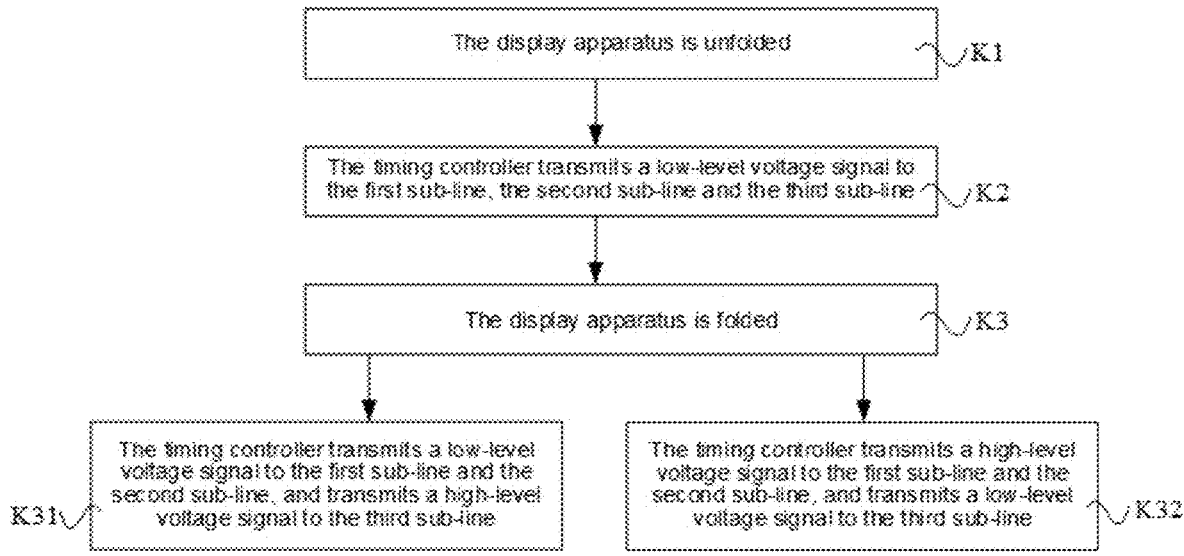
FIG. 18 is a flowchart of another control method for a display apparatus, in accordance with some embodiments.

In some embodiments, as shown in FIG. 18, in a case where the display apparatus 1000 includes the first touch sub-region U1 and the second touch sub-region U2, the control signal lines Z in the display apparatus 1000 includes the first sub-line Z1, the second sub-line Z2 and the third sub-line Z3, and the switch transistor T' in the switch module T is the P-MOS transistor, the control method includes the following steps.

In K1, the display apparatus 1000 is unfolded.

Figure 19:
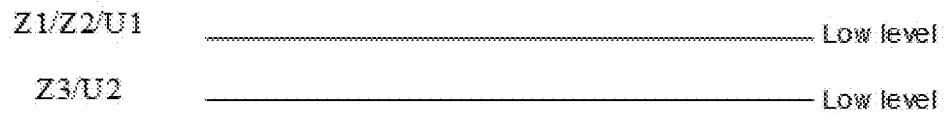
FIG. 19 is a timing diagram of a control method for a display apparatus, in accordance with some embodiments.
Figure 19:
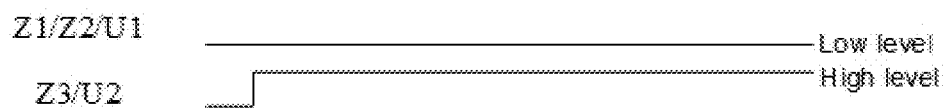
Figure 19:
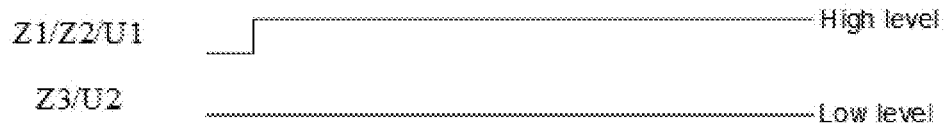

In K2, referring to FIG. 19, the timing controller 400 transmits a low-level voltage signal to the first sub-line Z1, the second sub-line Z2, and the third sub-line Z3. As a result, all switch modules T electrically connected to the first sub-line Z1, the second sub-line Z2 and the third sub-line Z3 are in an on state. That is, the first touch sub-region U1 and the second touch sub-region U2 may both perform the touch sensing.

In K3, the display apparatus 1000 is folded.

In K31, referring to FIG. 19, the timing controller 400 transmits a low-level voltage signal to the first sub-line Z1 and the second sub-line Z2, and transmits a high-level voltage signal to the third sub-line Z3. As a result, switch modules T electrically connected to the first sub-line Z1 and the second sub-line Z2 are in an on state, that is, the first touch sub-region U1 may perform the touch sensing; and switch modules T electrically connected to the third sub-line Z3 are in an off state, that is, the second touch sub-region U2 is in the sleep state.

In K32, referring to FIG. 19, the timing controller 400 transmits a high-level voltage signal to the first sub-line Z1 and the second sub-line Z2, and transmits a low-level voltage signal to the third sub-line Z3. As a result, the switch modules T electrically connected to the first sub-line Z1 and the second sub-line Z2 are in the off state, that is, the first touch sub-region U1 is in the sleep state; and the switch modules T electrically connected to the third sub-line Z3 are in the on state, that is, the second touch sub-region U2 may perform the touch sensing.

Through the above control method, the split-screen control of the first touch sub-region U1 and the second touch sub-region U2 of the display apparatus 1000 may be achieved.

The foregoing descriptions are merely specific implementations of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure should be determined by the protection scope of the claims.

What is claimed is:

1. A display panel, comprising a touch region and a peripheral region surrounding the touch region, the peripheral region including a bonding region located on a side of the touch region, and the touch region including a plurality of touch sub-regions, wherein the display panel comprises:
a plurality of touch channels disposed in each touch sub-region;
a plurality of touch wires, wherein an end of each touch wire is electrically connected to a single touch channel, and another end of each touch wire extends to the bonding region; and
a plurality of switch modules disposed between the touch region and the bonding region, wherein in the plurality of touch wires, for multiple touch wires electrically connected to the plurality of touch channels located in a same touch sub-region, each of at least a part of the multiple touch wires is electrically connected to a switch module, wherein
the switch module is configured to receive a touch signal and conduct a path of the touch signal in a touch wire, so that touch sensing is performed in a touch sub-region where a touch channel electrically connected to the touch wire is located; or the switch module is configured to disconnect the path of the touch signal transmitted in the touch wire;
wherein in each touch sub-region, the plurality of touch channels include a plurality of first touch channels and a plurality of second touch channels, and the plurality of first touch channels and the plurality of second touch channels are crossed and insulated from each other; and
the plurality of touch wires include a plurality of first touch wires and a plurality of second touch wires, in the plurality of first touch wires and the plurality of second touch wires, multiple first touch wires are electrically connected to the plurality of first touch channels, and multiple second touch wires are electrically connected to the plurality of second touch channels, wherein
each of the multiple first touch wires is electrically connected to one switch module, and switch modules connected to the multiple first touch wires are configured to receive a same switch control signal; and/or
each of the multiple second touch wires is electrically connected to one switch module, and switch modules connected to the multiple second touch wires are configured to receive a same switch control signal.

2. The display panel according to claim 1, wherein the switch module includes at least one switch transistor; a gate of the switch transistor is configured to receive a switch control signal, a first electrode of the switch transistor is configured to receive the touch signal, and a second electrode of the switch transistor is electrically connected to the touch wire.

3. The display panel according to claim 2, further comprising:
a substrate;
an active layer disposed on the substrate, wherein the active layer includes first active layer patterns located between the touch region and the bonding region, and a first active layer pattern forms a channel, the first electrode, and the second electrode of the switch transistor; and
a gate conductive layer stacked with the active layer, wherein the gate conductive layer includes gate conductive patterns located between the touch region and the bonding region, and a gate conductive pattern forms the gate of the switch transistor.

4. The display panel according to claim 2, further comprising:
a control signal line electrically connected to the gate of the switch transistor, wherein the control signal line is configured to transmit the switch control signal to the switch transistor, and the switch control signal is used to control the switch transistor to be turned on or off.

5. The display panel according to claim 4, wherein the display panel comprises a substrate, an active layer disposed on the substrate and a gate conductive layer stacked with the active layer; the active layer includes first active layer patterns located between the touch region and the bonding region, and a first active layer pattern forms a channel, the first electrode, and the second electrode of the switch transistor; the gate conductive layer includes gate conductive patterns located between the touch region and the bonding region, and a gate conductive pattern forms the gate of the switch transistor; and the control signal line is arranged in the gate conductive layer, and the control signal line and the gate conductive pattern form a one-piece structure.

6. The display panel according to claim 4, wherein the display panel includes a plurality of control signal lines, and the touch sub-region corresponds to at least one control signal line; and
for the at least one control signal line and the touch sub-region corresponding to the at least one control signal line, switch transistors connected to a plurality of touch channels located in the touch sub-region are all electrically connected to the at least one control signal line.

7. The display panel according to claim 4, wherein the display panel includes a plurality of switch module groups, each switch module group includes at least one switch module, and the at least one switch module in a same switch module group transmits a same switch control signal; and
in the plurality of touch sub-regions, each touch sub-region corresponds to at least one switch module in at least one switch module group, and different touch sub-regions correspond to different switch module groups.

8. The display panel according to claim 1, wherein a first touch channel in the plurality of first touch channels extends in a first direction, a second touch channel in the plurality of second touch channels extends in a second direction, and the first direction and the second direction intersect; the plurality of touch sub-regions include a first touch sub-region and a second touch sub-region, and the first touch sub-region and the second touch sub-region are arranged in parallel along the second direction; and
the display panel includes a plurality of switch module groups, and each switch module group includes at least one switch module; and first touch wires connected to first touch channels in the first touch sub-region and first touch wires connected to first touch channels in the second touch sub-region are electrically connected to respective switch modules in different switch module groups.

9. The display panel according to claim 8, wherein two second touch channels arranged in parallel along the second direction form a touch queue, and the two second touch channels are respectively arranged in the first touch sub-region and the second touch sub-region, wherein
the two second touch channels belonging to the same touch queue are electrically connected; a second touch wire connected to a second touch channel in the first touch sub-region and a second touch wire connected to a second touch channel in the second touch sub-region both directly receive touch signals; or
the two second touch channels belonging to the same touch queue are separately from each other; a second touch wire connected to a second touch channel in the first touch sub-region and a second touch wire connected to a second touch channel in the second touch sub-region are electrically connected to respective switch modules in different switch module groups.

10. The display panel according to claim 8, wherein the peripheral region includes a first peripheral region, a second peripheral region, a third peripheral region, and a fourth peripheral region that are connected in sequence; the first peripheral region and the third peripheral region are arranged opposite to each other, the second peripheral region and the fourth peripheral region are arranged opposite to each other, and the first peripheral region extends in the second direction; and the bonding region is disposed in the fourth peripheral region;
first touch wires electrically connected to a plurality of first touch channels in the first touch sub-region extend to the bonding region through the first peripheral region and/or to the bonding region through the third peripheral region;
among a plurality of second touch channels in the first touch sub-region, second touch wires electrically connected to second touch channels close to the first peripheral region extend to the bonding region through the first peripheral region, and second touch wires electrically connected to second touch channels close to the third peripheral region extend to the bonding region through the third peripheral region;
first touch wires electrically connected to a plurality of first touch channels in the second touch sub-region extend to the bonding region through the first peripheral region and/or to the bonding region through the third peripheral region; and
second touch wires electrically connected to a plurality of second touch channels in the second touch sub-region directly extend to the bonding region.

11. The display panel according to claim 10, wherein the display panel further includes control signal lines, the control signal lines include the first sub-line, a second sub-line and a third sub-line; in a direction from the first peripheral region to the third peripheral region, the first sub-line, the third sub-line and the second sub-line are arranged in sequence; and the first sub-line and the second sub-line transmit same switch control signals;
switch modules corresponding to first touch wires extending through the first peripheral region in the first touch wires electrically connected to the plurality of first touch channels in the first touch sub-region, as well as switch modules corresponding to second touch wires electrically connected to second touch channels close to the first peripheral region in the plurality of second touch channels in the first touch sub-region, are all electrically connected to the first sub-line;
switch modules corresponding to first touch wires extending through the third peripheral region in the first touch wires electrically connected to the plurality of first touch channels in the first touch sub-region, as well as switch modules corresponding to second touch wires electrically connected to second touch channels close to the third peripheral region in the plurality of second touch channels in the first touch sub-region, are all electrically connected to the second sub-line; and switch modules corresponding to the first touch wires electrically connected to the plurality of first touch channels in the second touch sub-region and switch modules corresponding to the second touch wires electrically connected to the plurality of second touch channels in the second touch sub-region are all electrically connected to the third sub-line.

12. A display apparatus, comprising:
the display panel according to claim 1;
a touch chip electrically connected to the plurality of switch modules in the display panel, wherein the touch chip is configured to transmit touch signals to the plurality of switch modules; and
a timing controller electrically connected to the plurality of switch modules, wherein the timing controller is configured to transmit switch control signals to the plurality of switch modules, and a switch control signal is used to control a switch module to be turned on or off.

13. The display apparatus according to claim 12, wherein the switch control signals transmitted by the timing controller includes a first switch control signal and a second switch control signal, the first switch control signal is used to control the switch module to be turned on, and the second switch control signal is used to control the switch module to be turned off;
the display apparatus is capable of being folded along a boundary line of two adjacent touch sub-regions of the display panel;
when the display apparatus is unfolded, the timing controller transmits the first switch control signal to switch modules corresponding to the two touch sub-regions, so that the two touch sub-regions perform touch sensing; and
when the display apparatus is folded, the timing controller transmits the first switch control signal to switch modules corresponding to one of the two touch sub-regions, and transmits the second switch control signal to switch modules corresponding to another one of the two touch sub-regions, so that the one of the two touch sub-regions performs the touch sensing.

14. The display apparatus according to claim 12, further comprising:
a circuit board bonded to the display panel, wherein the touch chip and the timing controller are disposed on the circuit board.

15. A display panel, comprising a touch region and a peripheral region surrounding the touch region, the peripheral region including a bonding region located on a side of the touch region, and the touch region including a plurality of touch sub-regions, wherein
the display panel comprises:
a substrate;
an active layer disposed on the substrate;
a gate conductive layer stacked with the active layer;
a plurality of touch channels disposed in each touch sub-region;
a plurality of touch wires, wherein an end of each touch wire is electrically connected to a single touch channel, and another end of each touch wire extends to the bonding region; and
a plurality of switch modules disposed between the touch region and the bonding region, wherein in the plurality of touch wires, for multiple touch wires electrically connected to the plurality of touch channels located in a same touch sub-region, each of at least a part of the multiple touch wires is electrically connected to a switch module, wherein
the switch module is configured to receive a touch signal and conduct a path of the touch signal in a touch wire, so that touch sensing is performed in a touch sub-region where a touch channel electrically connected to the touch wire is located; or the switch module is configured to disconnect the path of the touch signal transmitted in the touch wire;
the switch module includes at least one switch transistor;
a gate of the switch transistor is configured to receive a switch control signal, a first electrode of the switch transistor is configured to receive the touch signal, and a second electrode of the switch transistor is electrically connected to the touch wire;
the active layer includes first active layer patterns located between the touch region and the bonding region, and a first active layer pattern forms a channel, the first electrode, and the second electrode of the switch transistor; and
the gate conductive layer includes gate conductive patterns located between the touch region and the bonding region, and a gate conductive pattern forms the gate of the switch transistor.

16. The display panel according to claim 15, further comprising:
a source-drain conductive layer disposed on a side of the active layer and the gate conductive layer away from the substrate, wherein the source-drain conductive layer includes first connection patterns located between the touch region and the binding region;
a first insulating layer disposed between the source-drain conductive layer and the active layer, wherein the first insulating layer is provided with first via holes therein, and a first connection pattern is electrically connected to the first active layer pattern through a first via hole;
a touch conductive layer disposed on a side of the source-drain conductive layer away from the substrate, wherein the plurality of touch wires are arranged in the touch conductive layer; and
a second insulating layer disposed between the touch conductive layer and the source-drain conductive layer, wherein the second insulating layer is provided with second via holes therein, and the touch wire is electrically connected to the first connection pattern through a second via hole.

17. The display panel according to claim 16, wherein the source-drain conductive layer includes a first source-drain conductive layer and a second source-drain conductive layer; the first connection pattern includes a first connection sub-pattern and a second connection sub-pattern, the first connection sub-pattern is arranged in the first source-drain conductive layer, and the second connection sub-pattern is arranged in the second source-drain conductive layer; and
the display panel further comprises:
a third insulating layer disposed between the first source-drain conductive layer and the second source-drain conductive layer, wherein the third insulating layer is provided with third via holes therein, wherein
the first connection sub-pattern is electrically connected to the first active layer pattern through the first via hole, the second connection sub-pattern is electrically connected to the first connection sub-pattern through a third via hole, and the touch wire is electrically connected to the second connection sub-pattern through the second via hole.

18. The display panel according to claim 16, wherein the touch conductive layer includes a first conductive layer, a fourth insulating layer, and a second conductive layer that are stacked in sequence in a direction away from the substrate, wherein
- the touch wire is located in the first conductive layer; or
- the fourth insulating layer is provided with fourth via holes therein; the touch wire is located in the second conductive layer, and the touch wire is electrically connected to the first connection pattern through a fourth via hole and the second via hole in sequence.

19. The display panel according to claim 16, further comprising:
- touch pins disposed in the bonding region, wherein a touch pin is electrically connected to the switch module, and the touch pin is configured to be bonded to a circuit board.

20. The display panel according to claim 19, wherein the touch pins are arranged in the touch conductive layer; and the source-drain conductive layer further includes second connection patterns located on a side of the first connection patterns away from the touch region; and
- the first insulating layer is further provided with fifth via holes therein, and a second connection pattern is electrically connected to the first active layer pattern through a fifth via hole; and the second insulating layer is further provided with sixth via holes therein, and the touch pin is electrically connected to the second connection pattern through a sixth via hole.

\* \* \* \* \*